US012646844B2

(12) United States Patent
Yu et al.

(10) Patent No.: US 12,646,844 B2
(45) Date of Patent: Jun. 2, 2026

(54) ANTENNA APPARATUS AND ELECTRONIC DEVICE

(71) Applicant: Huawei Technologies Co., Ltd., Shenzhen (CN)

(72) Inventors: Dong Yu, Shanghai (CN); Zhijun Huang, Shanghai (CN); Kexin Liu, Shanghai (CN); Fangchao Zhao, Shanghai (CN); Peng Huang, Shanghai (CN); Hanyang Wang, Reading (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 300 days.

(21) Appl. No.: 18/254,992

(22) PCT Filed: Nov. 29, 2021

(86) PCT No.: PCT/CN2021/134016
§ 371 (c)(1),
(2) Date: May 30, 2023

(87) PCT Pub. No.: WO2022/111687
PCT Pub. Date: Jun. 2, 2022

(65) Prior Publication Data

US 2024/0021993 A1 Jan. 18, 2024

(30) Foreign Application Priority Data

Nov. 30, 2020 (CN) ......................... 202011380031.6

(51) Int. Cl.
*H01Q 9/42* (2006.01)
*H01Q 1/22* (2006.01)
(Continued)

(52) U.S. Cl.
CPC ............. *H01Q 9/0407* (2013.01); *H01Q 1/22* (2013.01); *H01Q 5/35* (2015.01)

(58) Field of Classification Search
CPC .......... H01Q 1/22; H01Q 1/243; H01Q 1/521; H01Q 5/35; H01Q 5/50; H01Q 5/28;
(Continued)

(56) References Cited

U.S. PATENT DOCUMENTS 9,306,276 B2 * 4/2016 Shi ......................... H01Q 5/371
9,450,291 B2 * 9/2016 Korva .................... H01Q 5/371
(Continued)

FOREIGN PATENT DOCUMENTS

CN 107453056 A 12/2017
CN 108633199 A 10/2018
(Continued)

*Primary Examiner* — Dimary S Lopez Cruz
*Assistant Examiner* — Marin Stoytchev Stoytchev
(74) *Attorney, Agent, or Firm* — Conley Rose, P.C.

(57) ABSTRACT

An antenna apparatus includes a first branch, a frame branch, and a second branch. The frame branch is provided with a first gap, and the frame branch is divided into a first frame branch and a second frame branch by the first gap. The first branch, the second branch, the first frame branch and the second frame branch are conductive, not in contact with each other and are insulated from each other A first feeding circuit is electrically connected to the second frame branch, configured to transmit a first excitation signal to the second frame branch, and excite the second frame branch to radiate a first radio wave. A second feeding circuit is electrically connected to the second branch, configured to transmit a second excitation signal to the second branch, and excite the second branch to radiate a second radio wave.

20 Claims, 16 Drawing Sheets

(51) Int. Cl.
*H01Q 5/35* (2015.01)
*H01Q 5/50* (2015.01)
*H01Q 9/04* (2006.01)

(58) Field of Classification Search
CPC ........ H01Q 5/385; H01Q 9/42; H01Q 9/0407; H01Q 21/28; H01Q 13/106; H01Q 13/206; H01Q 19/005
See application file for complete search history.

(56) References Cited

U.S. PATENT DOCUMENTS

| | | | | |
|---|---|---|---|---|
| 2009/0273521 | A1 | 11/2009 | Wong et al. | |
| 2013/0135157 | A1* | 5/2013 | Tsou | H04M 1/026 343/702 |
| 2018/0248264 | A1* | 8/2018 | Chen | H01Q 9/40 |
| 2018/0269561 | A1 | 9/2018 | Kim et al. | |
| 2018/0358699 | A1* | 12/2018 | Li | H01Q 9/42 |
| 2018/0375196 | A1 | 12/2018 | Han et al. | |
| 2020/0295464 | A1* | 9/2020 | Komura | H01Q 15/24 |
| 2020/0343623 | A1 | 10/2020 | Guan | |

FOREIGN PATENT DOCUMENTS

| | | | |
|---|---|---|---|
| CN | 108767499 | A | 11/2018 |
| CN | 111725608 | A | 9/2020 |
| CN | 111864349 | A | 10/2020 |
| KR | 20180031424 | A | 3/2018 |

* cited by examiner

ANTENNA APPARATUS AND ELECTRONIC DEVICE

This is a U.S. National Stage of International Patent Application No. PCT/CN2021/134016 filed on Nov. 29, 2021, which claims priority to Chinese Patent Application No. 202011380031.6 filed on Nov. 30, 2020, both of which are hereby incorporated by reference in their entireties.

TECHNICAL FIELD

This application relates to the field of antenna technologies, and in particular, to an antenna apparatus and an electronic device.

BACKGROUND

With development of communications technologies and electronic devices, especially with coming of a fifth-generation (5G) mobile communications technology era, electronic devices need to support more antennas and frequency bands, to achieve a high transmission rate needed by 5G. For example, a multiple-input multiple-output (multiple-input multiple-output, MIMO) technology is used for an electronic device, and a space diversity gain can effectively improve channel reliability, reduce a channel bit error rate, and finally improve a data rate. However, in a MIMO antenna structure, a quantity of antennas is in direct proportion to space occupied by the antennas. Therefore, excessively-limited space inside the electronic device limits both a frequency band that can be covered by a MIMO antenna and performance. How to implement an antenna with high isolation in compact space, especially intra-frequency decoupling between a frame antenna and a support antenna that are closely adjacent to each other, is an urgent problem to be resolved.

SUMMARY

In view of this, an antenna apparatus and an electronic device are proposed.

According to a first aspect, an embodiment of this application provides an antenna apparatus. The apparatus includes a first branch, a frame branch, and a second branch.

The frame branch is provided with a first gap, and the frame branch is divided into a first frame branch and a second frame branch by the first gap.

The first branch and the second branch are each configured as a mirror-symmetric structure. A symmetry axis of the first branch coincides with a first center line of the first gap, a symmetry axis of the second branch is parallel to the first center line and is spaced from the first center line by a first distance, and the first center line is a center line that is of the first gap and that is perpendicular to a length direction of the frame branch.

A first end that is of the first frame branch and that is away from at least the first gap is electrically connected to a reference ground, and a first end that is of the second frame branch and that is away from the first gap is electrically connected to the reference ground.

According to the apparatus provided in the first aspect, intra-frequency decoupling of radio wave radiation performed by the second frame branch and the second branch is implemented.

According to the first aspect, in a first possible implementation of the apparatus, the first distance is less than or equal to one tenth of a wavelength of a second radio wave radiated by the second branch. A frequency of implementing decoupling between the second frame branch and the second branch may be changed by adjusting the distance between the second frame branch and the second branch.

According to the first aspect, in a second possible implementation of the apparatus, the first frame branch, the second frame branch, the first branch, and the second branch are in a strip shape. In this way, symmetry of the apparatus can be improved, to improve performance of the apparatus.

According to the first aspect, in a third possible implementation of the apparatus, the first branch is a reinforcing rib of the first gap, a length of the first branch is less than a half of a wavelength of a second radio wave radiated by the second branch and is greater than a quarter of the wavelength of the second radio wave radiated by the second branch, and a second distance between the first branch and the frame branch is less than one fifth of the wavelength of the second radio wave radiated by the second branch. In this way, performance of the apparatus may be improved.

According to the first aspect or any one of the first to the third possible implementations, in a fourth possible implementation of the apparatus, the apparatus further includes:

a first feeding circuit, electrically connected to the second frame branch, and configured to transmit a first excitation signal to the second frame branch, to generate, on the second frame branch, a current that flows away from a center of the second frame branch, and excite the second frame branch to radiate a first radio wave; and a second feeding circuit, electrically connected to the second branch, and configured to transmit a second excitation signal to the second branch, to generate, on the second branch, a current that flows to a center of the second branch, and excite the second branch to radiate the second radio wave.

A current excited after a current excited on the second frame branch by the first excitation signal is coupled onto the first branch and then re-coupled onto the second branch is opposite to a current excited on the second branch by the second excitation signal, to implement radiation by the first radio wave and the second radio wave.

According to the fourth possible implementation, in a fifth possible implementation of the apparatus, the second feeding circuit transmits the second excitation signal to the second branch through a center feedpoint located on the symmetry axis of the second branch.

According to the fourth possible implementation, in a sixth possible implementation of the apparatus, the first feeding circuit is electrically connected to a plurality of frame feedpoints on the second frame branch, and the first feeding circuit is further configured to transmit corresponding first excitation signals to the second frame branch through different frame feedpoints, to enable the second frame branch to radiate first radio waves with different radiation frequencies.

A radiation frequency range of the first radio wave includes any one of the following: 1700 MHz to 2700 MHz, 3300 MHz to 4200 MHz, and 4400 MHz to 5000 MHz, and a radiation frequency range of the second radio wave includes 4400 MHz to 5000 MHz.

According to the fourth possible implementation, in a seventh possible implementation of the apparatus, when a length of the first frame branch is greater than a length of the second frame branch, and the first end of the first frame branch is electrically connected to the reference ground, the apparatus further includes:

a third feeding circuit, electrically connected to a second end that is of the first frame branch and that is close to the first gap, and configured to transmit a third excitation signal to the first frame branch, and excite the first frame branch to radiate a third radio wave. A radiation frequency range of the third radio wave is different from radiation frequency ranges of both the first radio wave and the second radio wave.

According to the first aspect or any one of the first to the third possible implementations, in an eighth possible implementation of the apparatus, when a length of the first frame branch is less than or equal to a length of the second frame branch, both the first end and a second end of the first frame branch are grounded, or the first end that is of the first frame branch and that is away from the first gap is electrically connected to the reference ground, and a second end that is of the first frame branch and that is close to the first gap is connected in a floating manner.

According to the eighth possible implementation, in a ninth possible implementation of the apparatus, the apparatus further includes one or more of a first configuration circuit, a second configuration circuit, and a third configuration circuit.

The first configuration circuit is electrically connected to a second end of the second frame branch, and is configured to adjust a resonance frequency and a bandwidth of the first radio wave.

The second configuration circuit is electrically connected to a center feedpoint of the second branch, and is configured to adjust a resonance frequency and a bandwidth of the second radio wave.

The third configuration circuit is electrically connected to the second end of the first frame branch, and is configured to adjust a resonance frequency and a bandwidth of the third radio wave.

According to a second aspect, an embodiment of this application provides an electronic device. The electronic device includes a metal frame and the antenna apparatus according to the first aspect or any possible implementation of the first aspect, and the frame branch is a part of the metal frame.

These aspects and other aspects of this application are more concise and more comprehensive in descriptions of (a plurality of) embodiments.

BRIEF DESCRIPTION OF DRAWINGS

The accompanying drawings included in this specification and constituting a part of this specification and this specification jointly show example embodiments, features, and aspects of this application, and are intended to explain principles of this application.

DESCRIPTION OF EMBODIMENTS

Figure 1:
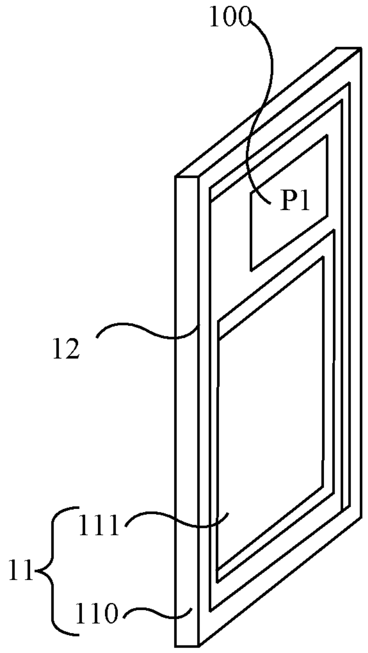
FIG. 1 is a schematic diagram of a structure of an electronic device according to an embodiment of this application.

The following describes various example embodiments, features, and aspects of this application in detail with reference to the accompanying drawings. Identical reference numerals in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, an embodiment, or an illustration". Any embodiment described as "example" is not necessarily explained as being superior or better than other embodiments.

In addition, to better describe this application, numerous specific details are provided in the following specific implementations. A person skilled in the art should understand that this application can also be implemented without some specific details. In some examples, methods, means, elements, and circuits that are well-known to a person skilled in the art are not described in detail, so that a subject matter of this application is highlighted.

An embodiment of this application provides an electronic device. The electronic device may be applied to various communication systems or communication protocols, such as a global system for mobile communications (global system for mobile communications, GSM), a code division multiple access (code division multiple access, CDMA) system, a wideband code division multiple access (wideband code division multiple access, WCDMA), a general packet radio service (general packet radio service, GPRS), and long term evolution (long term evolution, LTE). The electronic device may include an electronic product that has a wireless signal receiving and sending function, such as a mobile phone (mobile phone), a tablet computer (pad), a television, an intelligent wearable product (for example, a smartwatch or a smart band), an internet of things (internet of things, IOT), a virtual reality (virtual reality, VR) terminal device, an augmented reality (augmented reality, AR) terminal device, and an unmanned aerial vehicle. A specific form of the electronic device is not specifically limited in embodiments of this application.

FIG. 1 is a schematic diagram of a structure of an electronic device according to an embodiment of this application. As shown in FIG. 1, the electronic device may include a middle frame 11 and a rear housing (not shown in the figure). The middle frame 11 includes a bearing plate 111 and a metal frame 110 that wraps around circumference of the bearing plate 111. Electronic components such as a printed circuit board (printed circuit board, PCB) 100, a camera, and a battery may be disposed on a surface of the bearing plate 111 that faces the rear housing. The camera and the battery are not shown in the figure. The rear housing is connected to the middle frame 11 to form an accommodation cavity configured to accommodate the electronic components such as the PCB 100, the camera, and the battery. This can avoid impact on performance of the electronic components because of entering of external water vapor and dust into the accommodation cavity. The electronic device further includes an antenna apparatus shown in FIG. 2. A frame branch is a part of the metal frame 110.

When the electronic device has a display function, the electronic device may include a display module. The display module includes a liquid crystal display (liquid crystal display, LCD) module and a back light unit (back light unit, BLU). Alternatively, in some other embodiments of this application, the display module may be an organic light emitting diode (organic light emitting diode, OLED) display.

Figure 2:
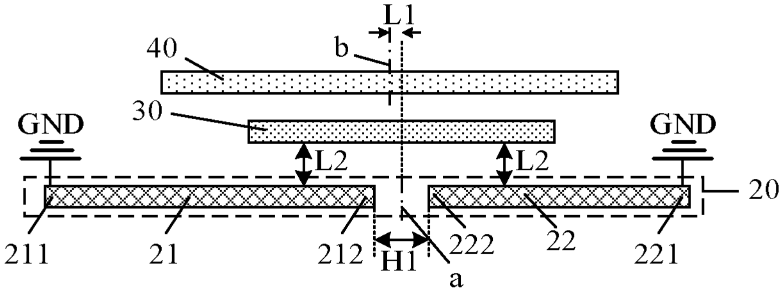
FIG. 2 is a schematic diagram of a structure of an antenna apparatus according to an embodiment of this application.

FIG. 2 is a schematic diagram of a structure of an antenna apparatus according to an embodiment of this application. As shown in FIG. 2, the apparatus includes a frame branch 20, a first branch 30, and a second branch 40. The frame branch 20 is provided with a first gap H1, and the frame branch 20 is divided into a first frame branch 21 and a second frame branch 22 by the first gap H1. The first branch 30 and the second branch 40 are configured as an a mirror-symmetric structure. A symmetry axis of the first branch 30 coincides with a first center line a of the first gap H1. A symmetry axis b of the second branch 40 is parallel to the first center line a and is spaced from the first center line a by a first distance L1. The first center line a is a center line that is of the first gap H1 and that is perpendicular to a length direction of the frame branch 20. A first end 211 that is of the first frame branch 21 and that is away from at least the first gap H1 is electrically connected to a reference ground GND. A first end 221 that is of the second frame branch 22 and that is away from the first gap H1 is electrically connected to the reference ground GND.

The frame branch 20, the first branch 30, and the second branch 40 are not in contact with each other and are insulated from each other.

According to the antenna apparatus provided in this application, intra-frequency decoupling of radio wave radiation performed by the second frame branch and the second branch is implemented.

In a possible implementation, the frame branch may be a part of the metal frame 111 of the foregoing electronic device. In a process of manufacturing the frame branch, the metal frame 111 may be manufactured by using a die casting process or a computerized numerical control (computerized numerical control, CNC) machining process, and then the metal frame 111 is slit, to form the first gap H1. The frame branch 20 are divided into a first frame branch 21 and a second frame branch 22 by the first gap H1. The first frame branch 21 includes a first end 211 and a second end 212, and the second frame branch 22 includes a first end 221 and a second end 222. One end (for example, a left end) of the first gap H1 may be used as the second end 212 of the first frame branch 21, and the other end (for example, a right end) may be used as the second end 222 of the second frame branch 22. As shown in FIG. 2, the first frame branch 21, the second frame branch 22, the first branch 30, and the second branch 40 may be in a strip shape. In this way, symmetry of the apparatus can be improved, to improve performance of the apparatus.

In a possible implementation, the first distance L1 is less than or equal to one tenth of a wavelength λ of the second radio wave radiated by the second branch, to be specific, $L1 \leq 0.1\lambda$. When the first distance is zero, the symmetry axis of the second branch coincides with the first center line. In addition, to facilitate description of locations of the second branch relative to the first branch and the frame branch, it may be set that when $L1 \in [-0.1\lambda, 0]$, the second branch is offset in a direction away from the second end 222 of the second frame branch 22 (offset leftwards as shown in FIG. 2). When $L1 \in [0, 0.1\lambda]$, the second branch is offset in a direction close to the second end 222 of the second frame branch 22 (offset rightwards as shown in FIG. 2). The first distance may be set based on frequencies of the first radio wave and the second radio wave, the first branch, and the like, to implement decoupling between the second frame branch and the second branch. When only the first distance is changed, by using a reference in which the symmetry axis of the second branch coincides with the first center line, offsetting the second branch in the direction close to the second end 222 of the second frame branch 22 causes a frequency of implementing decoupling between the second frame branch and the second branch to be increased (refer to FIG. 10*d* and related description), and offsetting the second branch in a direction away from the second end 222 of the second frame branch 22 causes the frequency of implementing decoupling between the second frame branch and the second branch to be reduced (refer to FIG. 10*d* and related description). A person skilled in the art may set the first distance based on an actual requirement. This is not limited in this application.

Figure 3:
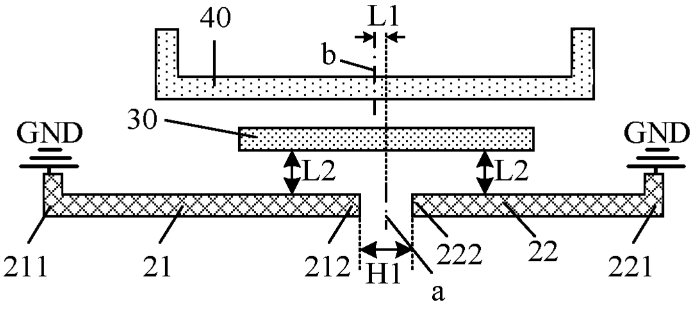
FIG. 3 is a schematic diagram of a structure of an antenna apparatus according to an embodiment of this application.

FIG. 3 is a schematic diagram of a structure of an antenna apparatus according to an embodiment of this application. In a possible implementation, the first end 211 of the first frame branch 21 may be electrically connected, by using a metal wire, a spring sheet, or a metal sheet, to the reference ground GND disposed on a first surface P1 of the PCB 100. As shown in FIG. 3, when the first frame branch 21 and the metal sheet are of an integrated structure, the first frame branch may be in an L shape. The first end 221 of the second frame branch 22 may also be electrically connected, by using a metal wire, a spring sheet, or a metal sheet, to the reference ground GND disposed on the first surface P1 of the PCB 100. In addition, as shown in FIG. 3, when the second frame branch 22 and the metal sheet are of an integrated structure, the second frame branch may be in an L shape.

Figure 4:
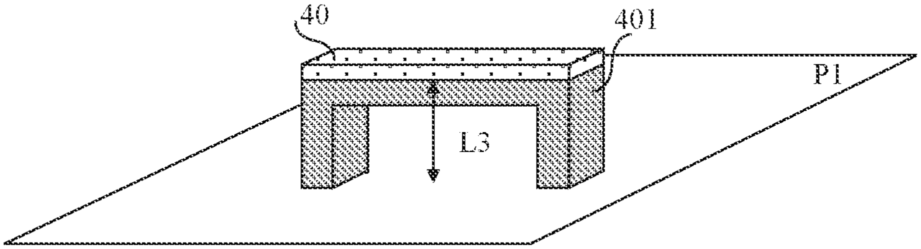
FIG. 4 is a schematic diagram of a structure of an antenna support in an antenna apparatus according to an embodiment of this application.

In a possible implementation, the second branch 40 may be fastened to the first surface P1 that is of the PCB 100 and that is close to the rear housing. FIG. 4 is a schematic diagram of a structure of an antenna support in an antenna apparatus according to an embodiment of this application. The apparatus may further include an antenna support 401, configured to fasten the second branch 40 onto the first surface P1, and enable a third distance L3 to exist between the second branch 40 and the first surface P1, to meet a requirement for the second branch to radiate a second radio wave. The third distance L3 may be set based on a performance requirement of the antenna apparatus. A smaller value of L3 indicates poorer performance of the second branch, and a larger value of L3 indicates better performance of the second branch. The second branch 40 is disposed on a surface on a side that is of the antenna support 401 and that is away from the first surface P1. A material of the antenna support 401 may be an insulating material, for example, plastic. In a process of manufacturing the second branch 40, a surface on a side that is of the antenna support 401 and that is away from the PCB 100 may be metalized directly on a surface that is of the antenna support and that is away from the first surface P1 through a laser direct structuring (laser direct structuring, LDS) process, to form the second branch 40. Alternatively, the manufactured metal sheet as the second branch 40 may be attached to a surface on a side that is of the antenna support 401 and that is away from the PCB 100. A person skilled in the art may set the manufacturing process of the second branch based on an actual requirement. This is not limited in this application.

In a possible implementation, the first branch 30 may be a reinforcing rib of the first gap H1. A length of the first branch may be less than a half of a wavelength of the second radio wave radiated by the second branch and greater than a quarter of the wavelength of the second radio wave radiated by the second branch. A second distance L2 between the first branch and the frame branch may be less than one fifth of the wavelength of the second radio wave radiated by the second branch, to ensure performance of the apparatus. The length of the first branch may be set based on the frequencies of the first radio wave and the second radio wave, the second branch, and the like, to implement decoupling between the second frame branch and the second branch. When other conditions of the apparatus remain unchanged, if the length of the first branch is less than a half of the wavelength of the second radio wave radiated by the second branch and is greater than a quarter of the wavelength of the second radio wave radiated by the second branch, a larger length of the first branch indicates a lower frequency corresponding to a decoupling pit (refer to FIG. 10*c* and related description). The first branch is configured to optimize a structural defect generated by the metal frame 111 due to the disposing of the first gap H1, optimize strength of the part of the metal frame 111 in the first gap H1, and avoid aluminum-plastic separation of the metal frame 111. A shorter distance between the first branch and the frame branch indicates a better effect. The first branch 30 may be fastened to the first surface P1 that is of the PCB 100 and that is close to the rear housing. The apparatus is further provided with a reinforcing rib support (a structure of the reinforcing rib support is similar to that of the foregoing antenna support), so that the first branch is fastened to the first surface P1 through the reinforcing rib support and is close to the first gap H1, or the first branch may be directly attached to the first surface P1 and is close to the first gap H1. Alternatively, the first branch may be directly fastened to the frame branch. For example, the first branch is directly attached to the frame branch, and it is ensured that the first branch is insulated from and is not in contact with the frame branch. A person skilled in the art may set a mounting and fastening manner of the first branch based on an actual requirement. This is not limited in this application. A material of the reinforcing rib support may be an insulating material, for example, plastic. In a process of manufacturing the first branch, the first branch may be directly processed and formed on a surface of the reinforcing rib support. Alternatively, the manufactured metal sheet as the first branch may be attached to a surface of the reinforcing rib support. A person skilled in the art may set the manufacturing process of the first branch based on an actual requirement. This is not limited in this application.

In this embodiment, to configure the first branch and the second branch as the a mirror-symmetric structure is to ensure an effect that the second branch and the second frame branch simultaneously perform decoupling of radio waves with same or similar radiation frequencies. Better symmetries of the first branch and the second branch indicate a better intra-frequency decoupling effect. In addition to a strip-shaped structure, the second branch may be in a "⊔" shape as shown in FIG. 3. To be specific, the second branch may be divided into mirror-symmetric L-shaped structures by the symmetry axis b of the second branch 40. In addition, to configure the second branch as a mirror-symmetric structure is to ensure radiation performance of the second branch.

Figure 5:
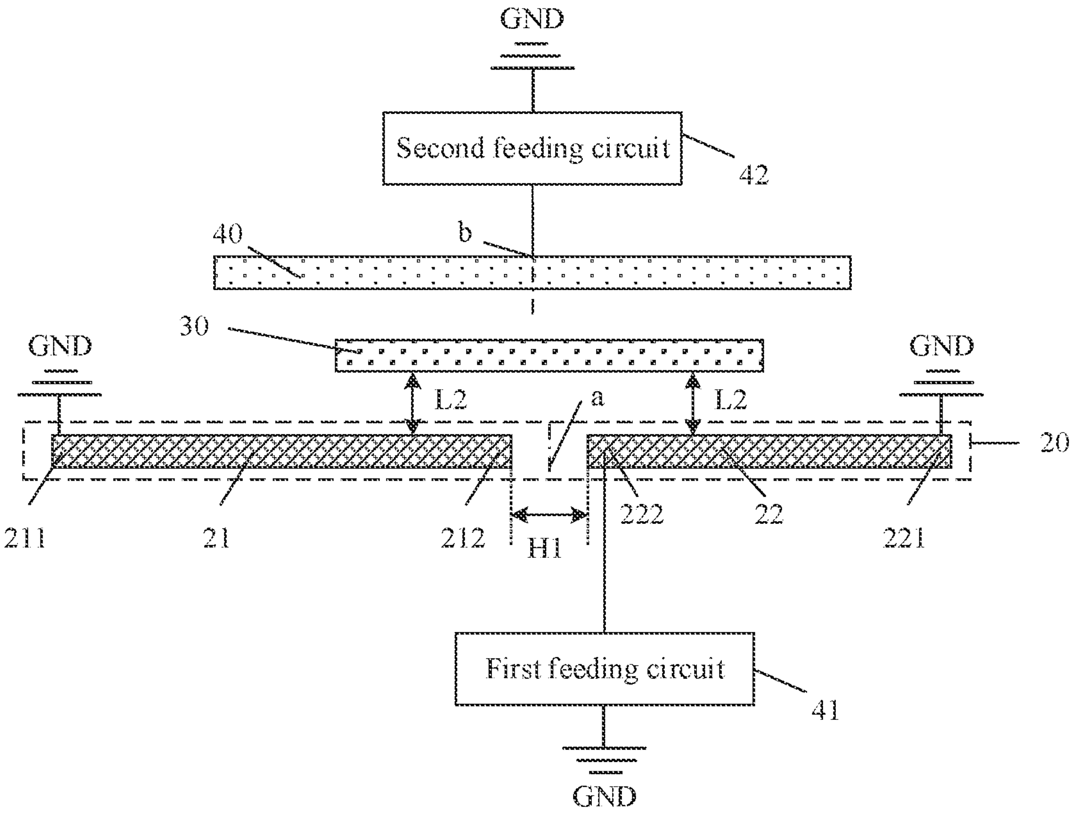
FIG. 5 is a schematic diagram of a structure of an antenna apparatus according to an embodiment of this application.

FIG. 5 is a schematic diagram of a structure of an antenna apparatus according to an embodiment of this application. As shown in FIG. 5, the apparatus may further include a first feeding circuit 41 and a second feeding circuit 42. The first feeding circuit 41 and the second feeding circuit 42 may be disposed on the first surface P1 of the PCB 100. Locations of the first feeding circuit 41 and the second feeding circuit 42 in FIG. 5 relative to the first branch, the second branch, and the frame branch do not represent relative locations in an actual electronic device.

The first feeding circuit 41 is electrically connected to the second frame branch 22, and is configured to transmit a first excitation signal to the second frame branch 22, to generate, on the second frame branch 22, a current that flows away from a center of the second frame branch 22, and excite the second frame branch 22 to radiate a first radio wave. The second feeding circuit 42 is electrically connected to the second branch 40, and is configured to transmit a second excitation signal to the second branch 40, to generate, on the second branch 40, a current that flows to a center of the second branch 40, and excite the second branch 40 to radiate a second radio wave. A current excited after a current excited on the second frame branch 22 by the first excitation signal is coupled onto the first branch 30 and then re-coupled onto the second branch 40 is opposite to a current that is on the second branch 40 and that is excited by the second excitation signal.

In a possible implementation, the first feeding circuit 41 has an input end that may be electrically connected to a plurality of frame feedpoints on the second frame branch 22, and an output end connected to a reference ground of the PCB 100. The first feeding circuit 41 is further configured to transmit corresponding first excitation signals to the second frame branch 22 through different frame feedpoints, to enable the second frame branch 22 to radiate first radio waves with different radiation frequencies. A radiation frequency range of the first radio wave includes any one of the following: a medium and high frequency range such as 1700 MHz to 2700 MHz, an N77 frequency band such as 3300 MHz to 4200 MHz, and an N79 frequency band such as 4400 MHz to 5000 MHz.

In this implementation, frame feedpoints used to radiate first radio waves with different frequency ranges may be different, and locations of the frame feedpoints on the second frame branch may be set based on a length of the second frame branch and a frequency of the first radio wave signal.

In a possible implementation, the second excitation signal is transmitted to the second branch 40 through a center feedpoint on the symmetry axis b of the second branch 40. A radiation frequency range of the second radio wave includes an N79 frequency band such as 4400 MHz to 5000 MHz. The second feeding circuit 42 has an input end electrically connected to the center feedpoint, and an output end connected to the reference ground of the PCB 100.

Figure 6A:
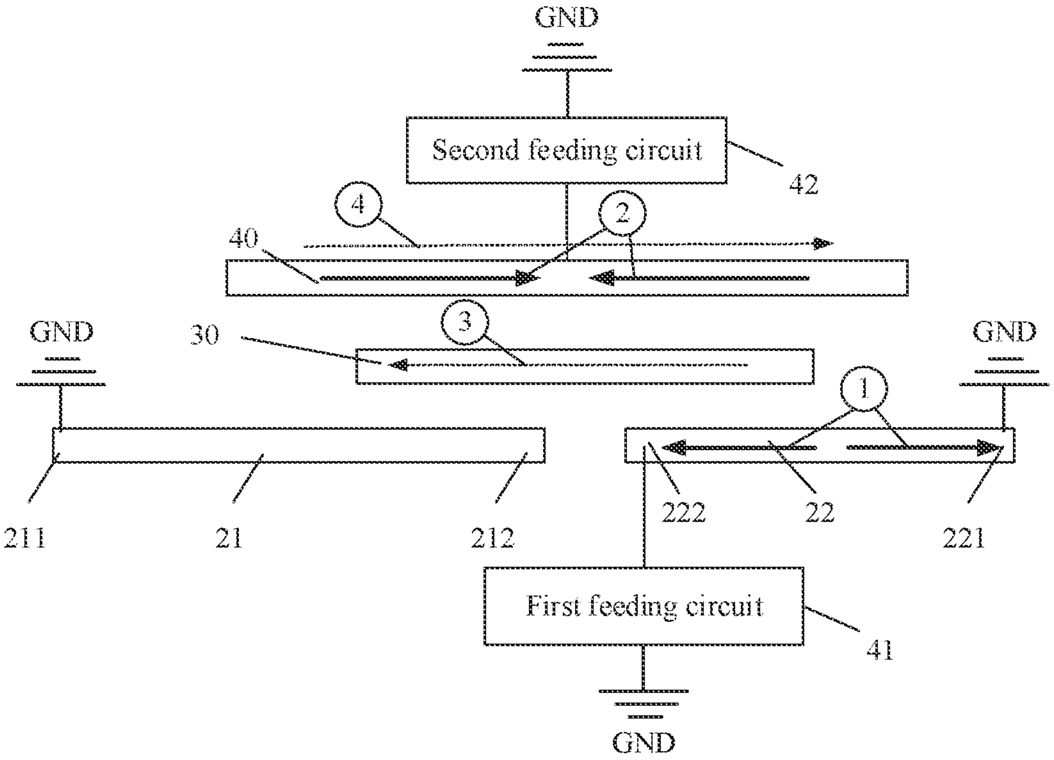
FIG. 6*a* and FIG. 6*b* are schematic diagrams of a flow direction of a current of an antenna apparatus according to an embodiment of this application.
Figure 6B:
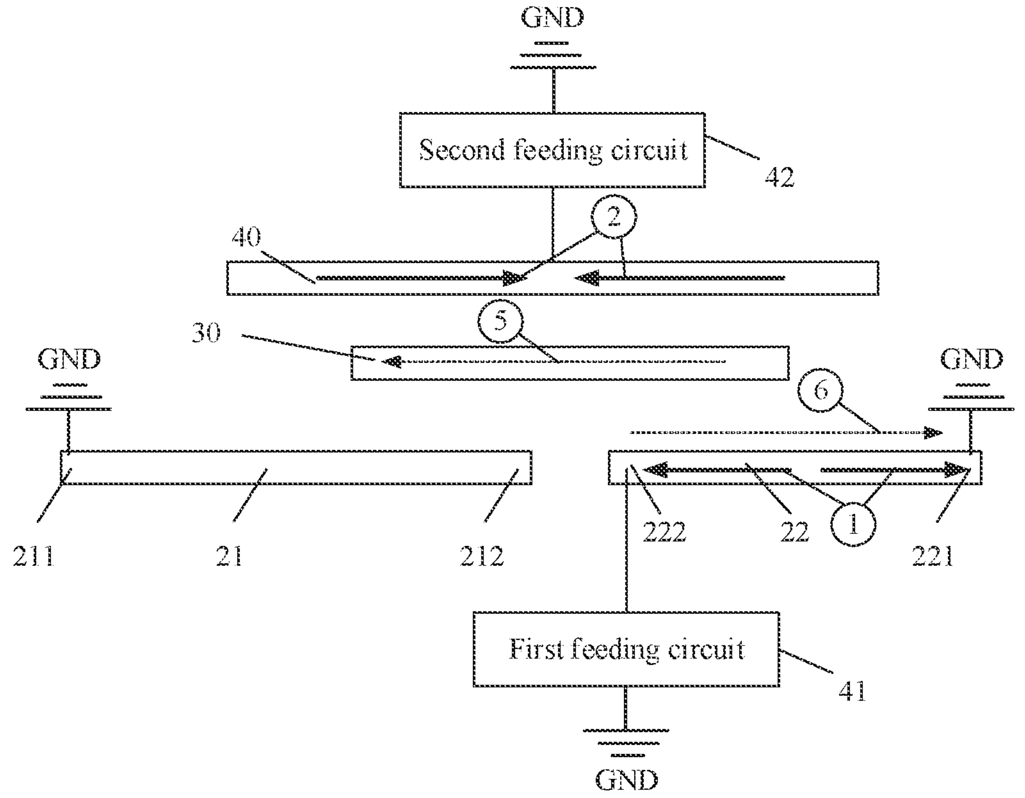

To describe an intra-frequency decoupling process of an antenna apparatus according to this application, FIG. 6*a* and FIG. 6*b* are schematic diagrams of a flow direction of a current of an antenna apparatus according to an embodiment of this application. It is assumed that both the second branch and the second frame branch radiate a radio wave of the N79 frequency band. As shown in FIG. 6*a* and FIG. 6*b*, the first feeding circuit 41 transmits the first excitation signal to the second frame branch 22, to generate, on the second frame branch 22, a current ① that flows away from a center of the second frame branch 22. To be specific, currents (currents shown by two solid line arrows shown in the second frame branch 22 in FIG. 6*a* and FIG. 6*b*, where directions of the arrows are flow directions of the currents) flowing from the center to the first end 221 and flowing from the center to the second end 222 are generated on the second frame branch 22, to radiate a first radio wave of the N79 frequency band. The second feeding circuit 42 transmits the second excitation signal to the second branch 40, to excite, on the second branch 40, a current that flows to a center of the second branch 40. To be specific, currents ② flowing from one end of the second branch 40 to the center and flowing from the other end of the second branch 40 to the center (currents shown by two solid line arrows shown in the second branch 40 in FIG. 6*a* and FIG. 6*b*, where directions of the arrows are flow directions of the currents) are generated on the second branch 40, to radiate a second radio wave of the N79 frequency band.

When the second frame branch radiates the first radio wave of the N79 frequency band and the second branch radiates the second radio wave of the N79 frequency band, "an excited current ① that flows away from a center of the second frame branch 22" is coupled onto the first branch 30 to generate a first codirectional current ③ (a current shown by a dashed line arrow shown in the first branch 30 in FIG. 6*a*, where a direction of the arrow is a flow direction of the current). Then, the first codirectional current ③ generated by the coupling on the first branch 30 is further coupled onto the second branch 40 to generate a new codirectional current ④ (a current shown by a dashed line arrow shown above the second branch 40 in FIG. 6*a*, where a direction of the arrow is a flow direction of the current). In this case, a current excited on the second branch 40 is the current ② that flows to the center of the second branch 40, and is opposite to the new codirectional current ④ generated by the coupling on the second branch 40 (a current shown by a dashed line arrow shown above the second branch 40 in FIG. 6*a*). The new codirectional current ④ cannot enter the second branch 40 through the center feedpoint, thereby implementing decoupling between the first radio wave of the N79 frequency band radiated by the second frame branch and the second radio wave of the N79 frequency band radiated by the second branch. In addition, "the excited current ② that flows to the center of the second branch 40" is coupled onto the first branch 30 to generate a second codirectional current ⑤ (a current shown by a dashed line arrow shown in the first branch 30 in FIG. 6*b*, where a direction of the arrow is a flow direction of the current). Then, the second codirectional current ⑤ generated by the coupling on the first branch 30 is further coupled onto the second frame branch 22 to generate a new codirectional current ⑥ (a current shown by a dashed line arrow shown above the second frame branch 22 in FIG. 6*b*, where a direction of the arrow is a flow direction of the current). In this case, a current excited on the second frame branch is the current ① that flows away from a center of the second frame branch 22, and is opposite to the new codirectional current ⑥ generated by the coupling on the second frame branch 22 (a current shown by a dashed line arrow shown above the second frame branch 22 in FIG. 6*b*, where a direction of the arrow is a flow direction of the current). The new codirectional current cannot enter the second frame branch 22 through the frame feedpoint, thereby implementing decoupling between the second radio wave of the N79 frequency band radiated by the second branch and the first radio wave of the N79 frequency band radiated by the second frame branch.

Figure 7:
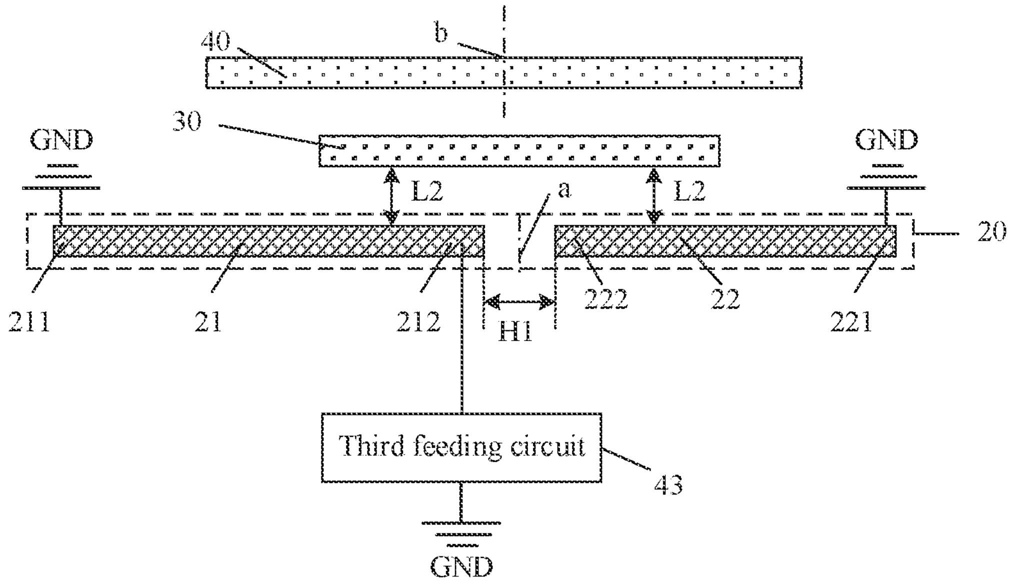
FIG. 7 is a schematic diagram of a structure of an antenna apparatus according to an embodiment of this application.

FIG. 7 is a schematic diagram of a structure of an antenna apparatus according to an embodiment of this application. In a possible implementation, as shown in FIG. 7, when a length of the first frame branch is greater than a length of the second frame branch, and a first end of the first frame branch is electrically connected to the reference ground, the apparatus may further include: a third feeding circuit 43, electrically connected to a second end 212 that is of the first frame branch 21 and that is close to the first gap H1, and configured to transmit a third excitation signal to the first frame branch 21, and excite the first frame branch 21 to radiate a third radio wave, where a radiation frequency range of the third radio wave is different from radiation frequency ranges of both the first radio wave and the second radio wave. The third feeding circuit has an input end connected to the second end 212 of the first frame branch 21, and an output end connected to the reference ground of the PCB 100. The third radio wave may be a low frequency wave, for example, 700 MHz to 960 MHz.

Figure 8:
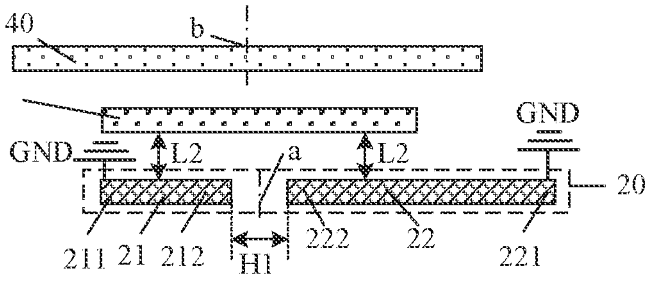
FIG. 8 and FIG. 9 are schematic diagrams of a structure of an antenna apparatus according to an embodiment of this application.
Figure 9:
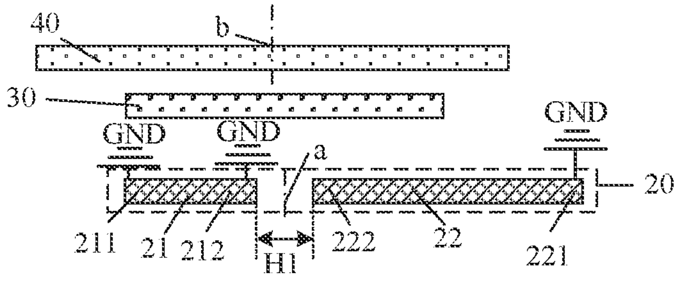

FIG. 8 and FIG. 9 are schematic diagrams of a structure of an antenna apparatus according to an embodiment of this application. In a possible implementation, when a length of the first frame branch 21 is less than or equal to a length of the second frame branch 22, as shown in FIG. 9, both the first end 211 and the second end 212 of the first frame branch 21 may be grounded; or as shown in FIG. 8, the first end 211 that is of the first frame branch 21 and that is away from the first gap H1 is electrically connected to the reference ground, and the second end 212 that is of the first frame branch 21 and that is close to the first gap H1 is connected in a floating manner.

In a possible implementation, the apparatus may further include one or more of a first configuration circuit, a second configuration circuit, and a third configuration circuit. The first configuration circuit is electrically connected to a second end of the second frame branch, and is configured to adjust a resonance frequency and a bandwidth of the first radio wave. The second configuration circuit is electrically connected to a center feedpoint of the second branch, and is configured to adjust a resonance frequency and a bandwidth of the second radio wave. The third configuration circuit is electrically connected to a second end of the first frame branch, and is configured to adjust a resonance frequency and a bandwidth of the third radio wave.

The antenna apparatus may radiate radio waves with different frequencies based on configuration of a length and a connection of the first frame branch of the antenna apparatus. For example, in the antenna apparatus shown in FIG. 8, when the length of the first frame branch 21 is less than the length of the second frame branch 22 and the first end 211 of the first frame branch 21 is grounded, radio waves that may be radiated by the antenna apparatus include: a radio wave whose frequency is 1.88 GHz and whose resonance is in a mode of a quarter wavelength of the second frame branch 22, a radio wave whose frequency is 3.6 GHz and whose resonance is in a mode of a quarter wavelength of the first frame branch 21, a radio wave whose frequency is 4.51 GHz and whose resonance is in a mode of a half wavelength of the first branch 30, a radio wave whose frequency is 4.97 GHz and whose resonance is in a mode of a three-quarter wavelength of the second frame branch 22, and a radio wave whose frequency is 4.89 GHz and whose resonance is in a common mode of the second branch 40. In the antenna apparatus shown in FIG. 9, when the length of the first frame branch 21 is less than the length of the second frame branch 22, and both the first end 211 and the second end 212 of the first frame branch 21 are grounded, radio waves that may be radiated by the antenna apparatus include: a radio wave whose frequency is 2.17 GHz and whose resonance is in a mode of a quarter wavelength of the second frame branch 22, a radio wave whose frequency is 3.8 GHz and whose resonance is in a mode of a half wavelength of the second branch 40, a radio wave whose frequency is 4.97 GHz and whose resonance is in a differential mode of being coupled to the first branch 30, and a radio wave whose frequency is 5 GHz and whose resonance is in a common mode of the second branch 40.

Figure 10A:
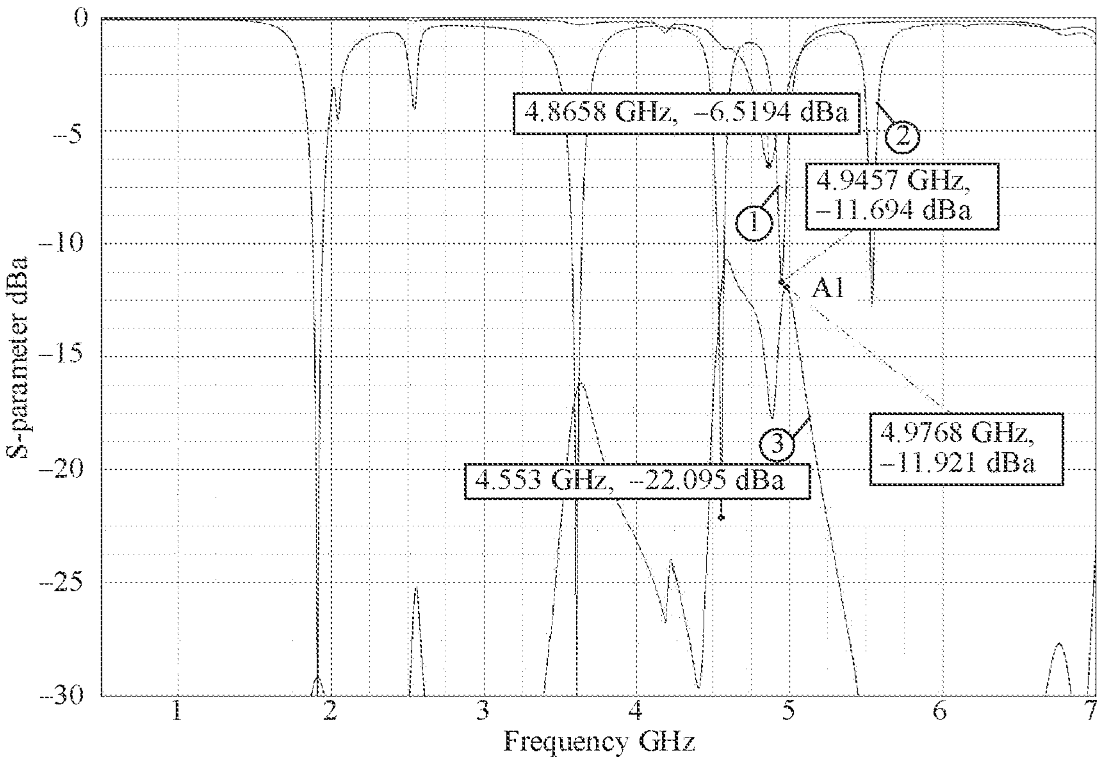
FIG. 10*a* is a curve diagram showing that an S-parameter of an antenna apparatus changes with a frequency according to an embodiment of this application.
Figure 10B:
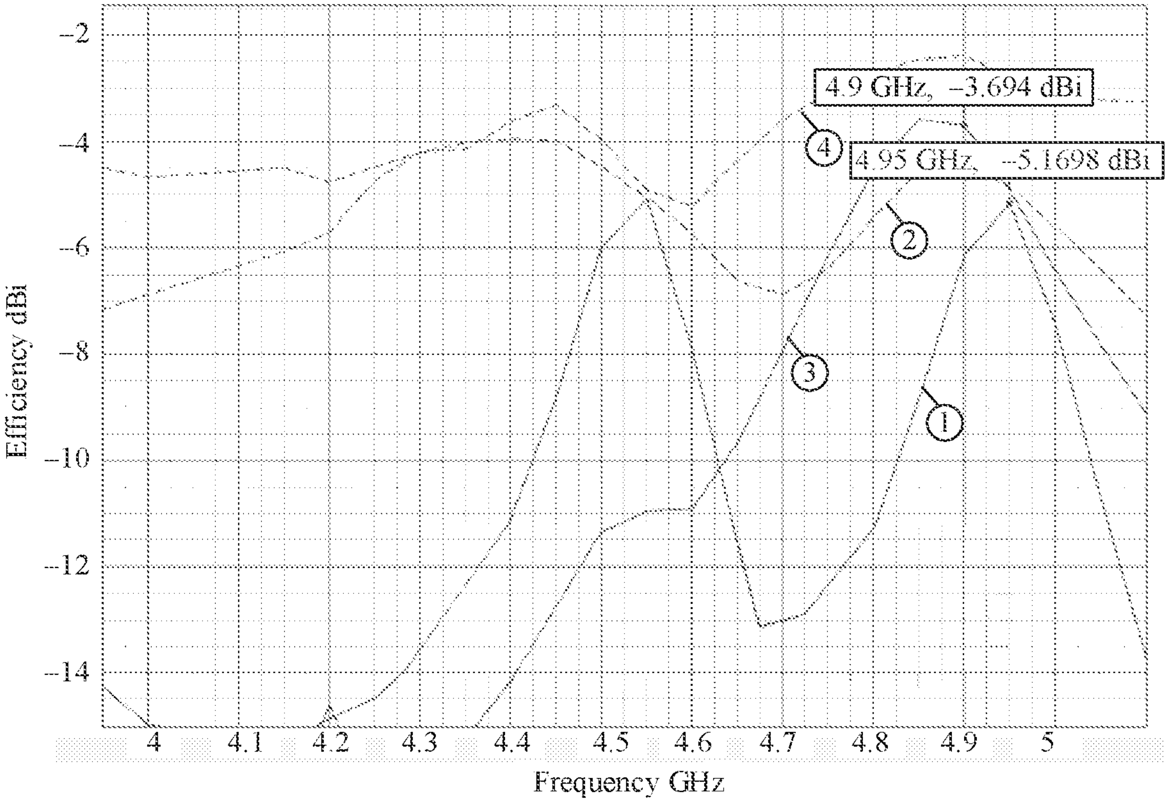
FIG. 10*b* is a curve diagram showing that efficiency of an antenna apparatus changes with a frequency according to an embodiment of this application.

FIG. 10*a* is a curve diagram showing that an S-parameter of an antenna apparatus changes with a frequency according to an embodiment of this application. The curve diagram shown in FIG. 10*a* is obtained by performing a simulation test on the antenna apparatus shown in FIG. 2 or FIG. 7 (where frequencies of both the first radio wave and the second radio wave are 4.9 GHz). As shown in FIG. 10*a*, a curve ① represents an input reflection coefficient of the second frame branch 22 (to be specific, a return loss of the first radio wave radiated by the second frame branch), and a curve ② is an input reflection coefficient of the second branch 40 (to be specific, a return loss of the second radio wave radiated by the second branch). The input reflection coefficient is a ratio of a reflected power to an incident power, and can represent an impedance matching degree of an antenna. A curve ③ represents a transmission coefficient from the second branch 40 to the second frame branch 22, and is a ratio of a transmit power to an incident power, and a specific negative value of the curve represents isolation between the second frame branch and the second branch. FIG. 10*b* is a curve diagram showing that efficiency of an antenna apparatus changes with a frequency according to an embodiment of this application. The curve diagram shown in FIG. 10*b* is obtained by performing a simulation test on the antenna apparatus shown in FIG. 2 or FIG. 7 (where frequencies of both the first radio wave and the second radio wave are 4.9 GHz) As shown in FIG. 10*b*, a curve ① represents system efficiency of the second frame branch 22, and a curve ② represents radiation efficiency of the second frame branch 22. A curve ③ represents system efficiency of the second branch 40, and a curve ④ represents radiation efficiency of the second branch 40. Through analysis with reference to FIG. 10*a* and FIG. 10*b*, it may be determined that the antenna apparatus may be disposed and adjusted to obtain a decoupling pit that can implement decoupling between the second frame branch and the second branch. When the second frame branch 22 and the second branch 40 radiate a radio wave at 4.9 GHZ, the worst isolation between the second frame branch and the second branch is 11.694 dBa (for example, point A1).

Figure 10C:
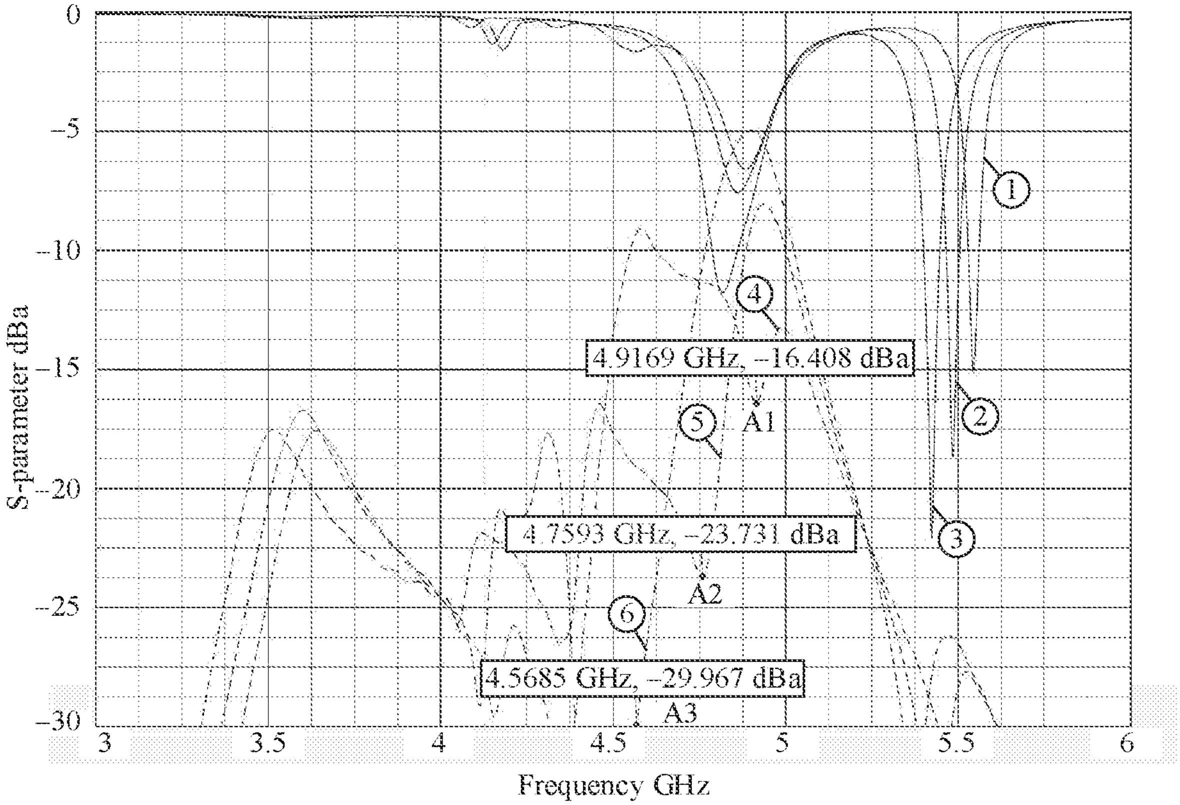
FIG. 10*c* is a curve diagram showing that an S-parameter of an antenna apparatus changes with a frequency according to an embodiment of this application.

In a possible implementation, a location of the decoupling pit may be adjusted by changing the length of the first branch. FIG. 10*c* is a curve diagram showing that an S-parameter of an antenna apparatus changes with a frequency according to an embodiment of this application. The curve diagram shown in FIG. 10*c* is obtained by performing a simulation test on the antenna apparatus shown in FIG. 2 or FIG. 7 (where frequencies of both the first radio wave and the second radio wave fall within the N79 frequency band). A curve ① and a curve ④ respectively represent an input reflection coefficient of the second branch 40 and a transmission coefficient from the second frame branch 22 to the second branch 40 when a length of the first branch is 14.5 mm. A point A1 represents a location of a decoupling pit, a radiation frequency corresponding to the decoupling pit is 4.9169 GHZ (in a frequency band corresponding to N79), and isolation is −16.408 dBa. A curve ② and a curve ⑤ respectively represent an input reflection coefficient of the second branch 40 and a transmission coefficient from the second frame branch 22 to the second branch 40 when a length of the first branch is 16.5 mm. A point A2 represents a location of a decoupling pit, a radiation frequency corresponding to the decoupling pit is 4.7593 GHZ (in a frequency band corresponding to N79), and isolation is −23.731 dBa. A curve ③ and a curve ⑥ respectively represent an input reflection coefficient of the second branch 40 and a transmission coefficient from the second frame branch 22 to the second branch 40 when a length of the first branch is 18.5 mm. A point A3 represents a location of a decoupling pit, a radiation frequency corresponding to the decoupling pit is 4.57 GHz (in a frequency band corresponding to N79), and isolation is 29.967 dBa. A location of the decoupling pit that implements decoupling between the second frame branch and the second branch may be adjusted by changing the length of the first branch 30. When other conditions of the apparatus remain unchanged, if the length of the first branch is less than a half of the wavelength of the second radio wave radiated by the second branch and is greater than a quarter of the wavelength of the second radio wave radiated by the second branch, a larger length of the first branch indicates a lower frequency corresponding to the decoupling pit.

Figure 10D:
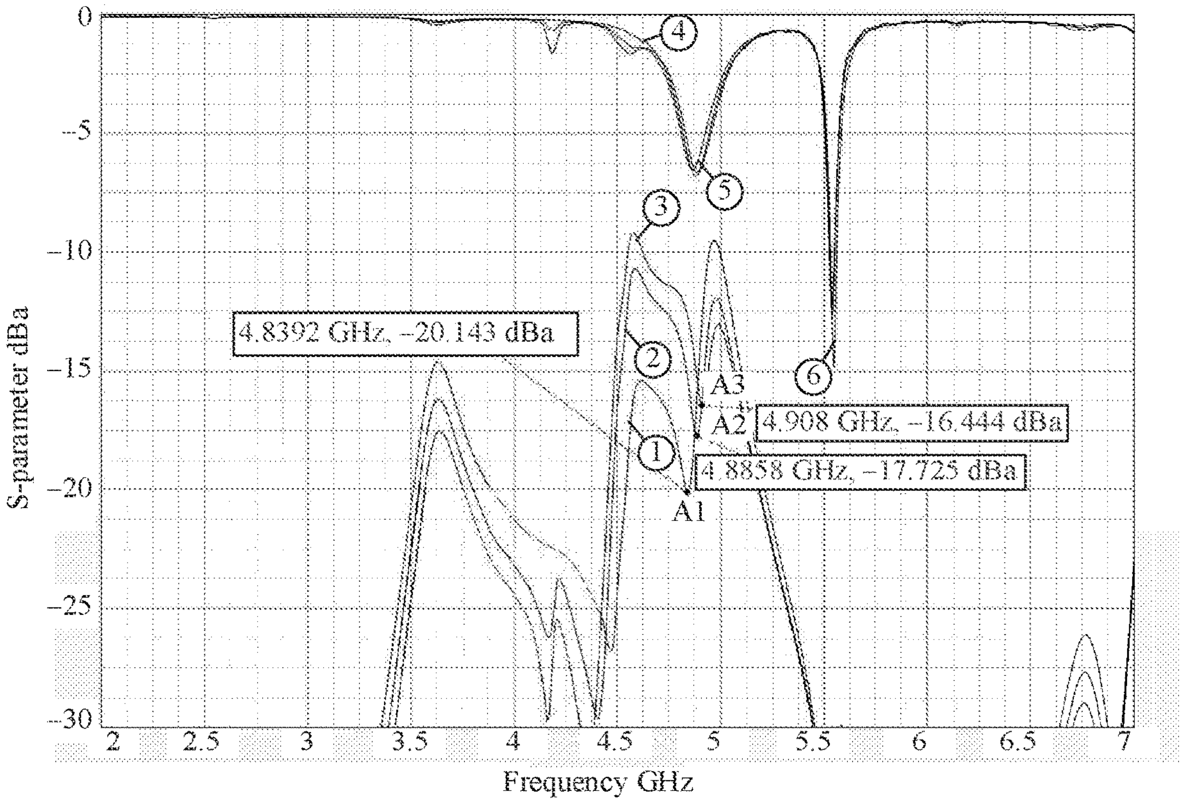
FIG. 10*d* is a curve diagram showing that an S-parameter of an antenna apparatus changes with a frequency according to an embodiment of this application.

In a possible implementation, a location of the decoupling pit may be adjusted by changing a first distance between a symmetry axis of the second branch and the first center line FIG. 10*d* is a curve diagram showing that an S-parameter of an antenna apparatus changes with a frequency according to an embodiment of this application. The curve diagram shown in FIG. 10*d* is obtained by performing a simulation test on the antenna apparatus shown in FIG. 2 or FIG. 7 (where frequencies of both the first radio wave and the second radio wave fall within the N79 frequency band). A curve ① and a curve ④ respectively represent an input reflection coefficient of the second branch 40 and a transmission coefficient from the second branch 40 to the second frame branch 22 when the second branch is offset leftwards by 0.3 mm, to be specific, when the first distance between the symmetry axis of the second branch and the first center line is 0.3 mm. A point A1 represents a location of a decoupling pit, a radiation frequency corresponding to the decoupling pit is 4.9 GHZ (in a frequency band corresponding to N79), and isolation is 20.143 dBa. A curve ② and a curve ⑤ respectively represent an input reflection coefficient of the second branch 40 and a transmission coefficient from the second branch 40 to the second frame branch 22 when the symmetry axis of the second branch coincides with the first center line (to be specific, the first distance is zero). A point A2 represents a location of a decoupling pit, a radiation frequency corresponding to the decoupling pit is 4.9 GHZ (in a frequency band corresponding to N79), and isolation is 17.725 dBa. A curve and a curve ⑥ respectively represent an input reflection coefficient of the second branch 40 and a transmission coefficient from the second branch 40 to the second frame branch 22 when the second branch is offset rightwards by 0.4 mm, to be specific, when the first distance between the symmetry axis of the second branch and the first center line is −0.4 mm. A point A3 represents a location of a decoupling pit, a radiation frequency corresponding to the decoupling pit is 4.9 GHZ (in a frequency band corresponding to N79), and isolation is 16.444 dBa. A location of the decoupling pit that implements decoupling between the second frame branch and the second branch may be adjusted by changing the first distance between the symmetry axis of the second branch and the first center line. When other conditions of the apparatus remain unchanged, if the first distance is less than or equal to one tenth of the wavelength of the second radio wave radiated by the second branch, a frequency corresponding to the decoupling pit is reduced when the second branch moves leftwards relative to the first center line, and a frequency corresponding to the decoupling pit is increased when the second branch moves rightwards relative to the first center line.

Figure 11:
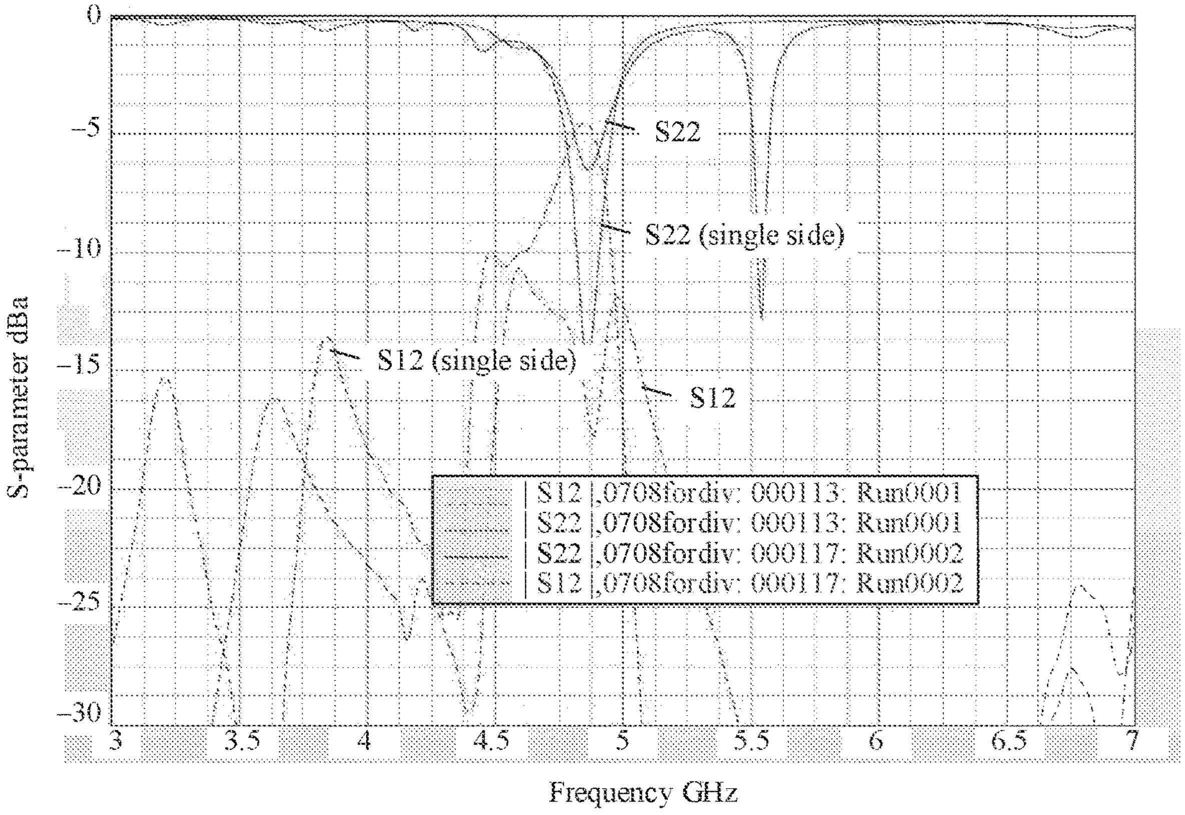
FIG. 11 is a curve diagram showing that an S-parameter of an antenna apparatus changes with a frequency according to an embodiment of this application.

FIG. 11 is a curve diagram showing that an S-parameter of an antenna apparatus changes with a frequency according to an embodiment of this application. The curve diagram shown in FIG. 11 includes: S12 and S22 that are obtained by performing a simulation test on the antenna apparatus in which L1≤0.1λ shown in FIG. 2 or FIG. 7 (where frequencies of both the first radio wave and the second radio wave fall within the N79 frequency band): and S12 (single side) and S22 (single side) that are obtained by performing a simulation test on the antenna apparatus in which a location of the second branch 40 in FIG. 2 or FIG. 7 is changed so that a first distance L1 between the symmetry axis b of the second branch and the first center line a is greater than or equal to a half of the length of the second branch (to be specific, the second branch is located only above the first frame branch, the second branch is a single-side differential mode, and frequencies of both the first radio wave and the second radio wave fall within the N79 frequency band), to be specific, L1≥0.5λ. S22 and S12 respectively represent an input reflection coefficient of the second branch 40 and a transmission coefficient from the second frame branch 22 to the second branch 40 when L1≤0.1λ. S22 (single side) and S12 (single side) respectively represent an input reflection coefficient of the second branch 40 and a transmission coefficient from the second frame branch 22 to the second branch 40 when L1≥0.5λ. Refer to curves S12, S22, S12 (single side), and S22 (single side) in FIG. 11. It may be determined that when L1≥0.5λ, the decoupling pit between the second frame branch and the second branch disappears, and the isolation deteriorates by 5 dB. Therefore, the first distance L1 needs to be controlled, so that the second branch is configured symmetrically or approximately symmetrically relative to the first center line.

Figure 12A:
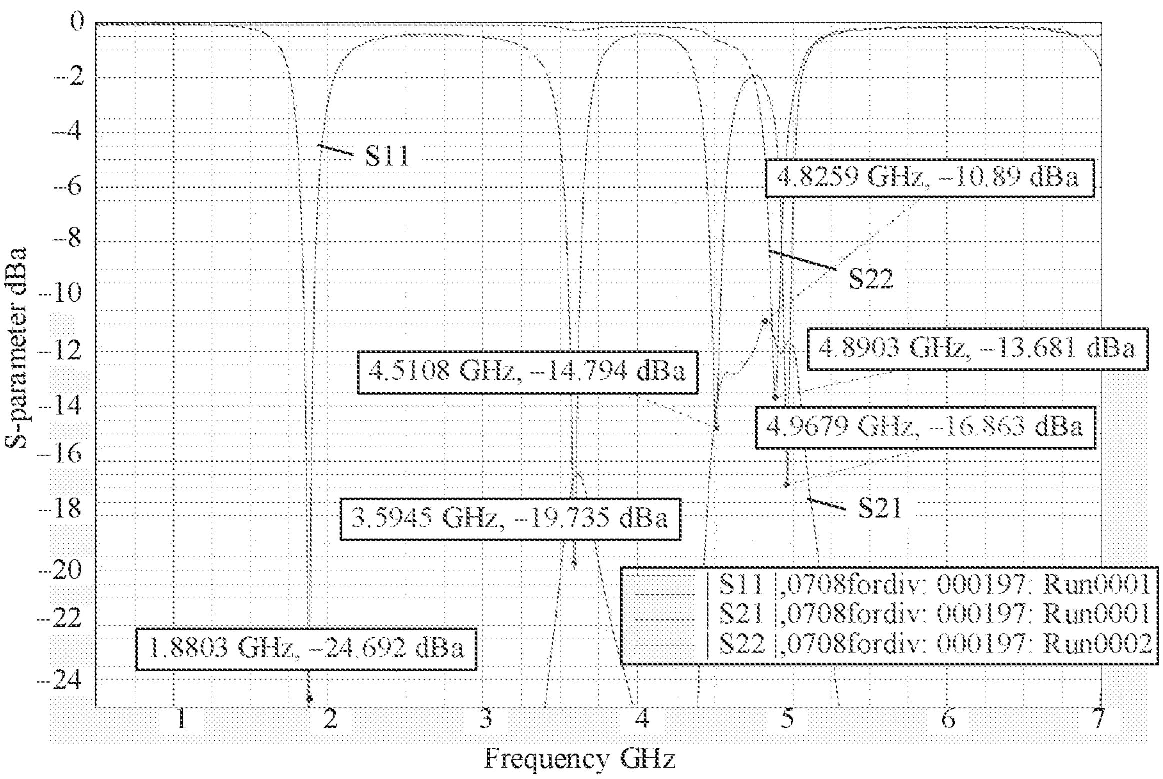
FIG. 12*a* is a curve diagram showing that an S-parameter of an antenna apparatus changes with a frequency according to an embodiment of this application.
Figure 12B:
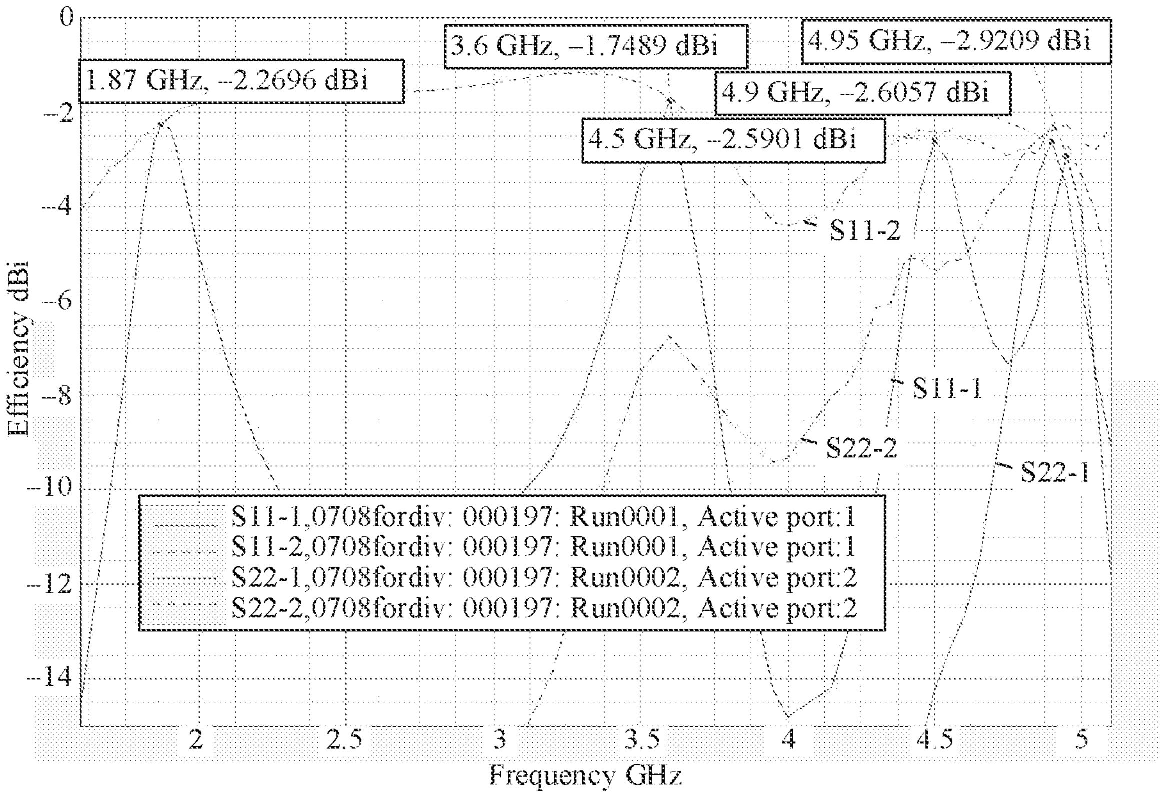
FIG. 12*b* is a curve diagram showing that efficiency of an antenna apparatus changes with a frequency according to an embodiment of this application.

FIG. 12*a* is a curve diagram showing that an S-parameter of an antenna apparatus changes with a frequency according to an embodiment of this application. The curve diagram shown in FIG. 12*a* is obtained by performing a simulation test on the antenna apparatus shown in FIG. 8 (where frequencies of both the first radio wave and the second radio wave are 4.9 GHZ). As shown in FIG. 12*a*, a curve S11 represents an input reflection coefficient of the second frame branch 22 (to be specific, a return loss of the first radio wave radiated by the second frame branch), and a curve S22 represents an input reflection coefficient of the second branch 40 (to be specific, a return loss of the second radio wave radiated by the second branch). The input reflection coefficient is a ratio of a reflected power to an incident power, and can represent an impedance matching degree of an antenna. A curve S21 represents a transmission coefficient from the second branch 40 to the second frame branch 22, and is a ratio of a transmit power to an incident power, and a specific negative value of the curve represents isolation between the second frame branch and the second branch. FIG. 12*b* is a curve diagram showing that efficiency of an antenna apparatus changes with a frequency according to an embodiment of this application. The curve diagram shown in FIG. 12*b* is obtained by performing a simulation test on the antenna apparatus shown in FIG. 8 (where frequencies of both the first radio wave and the second radio wave are 4.9 GHZ). As shown in FIG. 12*b*, a curve S11-1 represents system efficiency of the second frame branch 22, and a curve S11-2 represents radiation efficiency of the second frame branch 22. A curve S22-1 represents system efficiency of the second branch 40, and a curve S22-2 represents radiation efficiency of the second branch 40. Through analysis with reference to FIG. 12*a* and FIG. 12*b*, it may be determined that, shortening the length of the first frame branch of the antenna apparatus can also obtain a decoupling pit that implements decoupling between the second frame branch and the second branch.

Figure 12C:
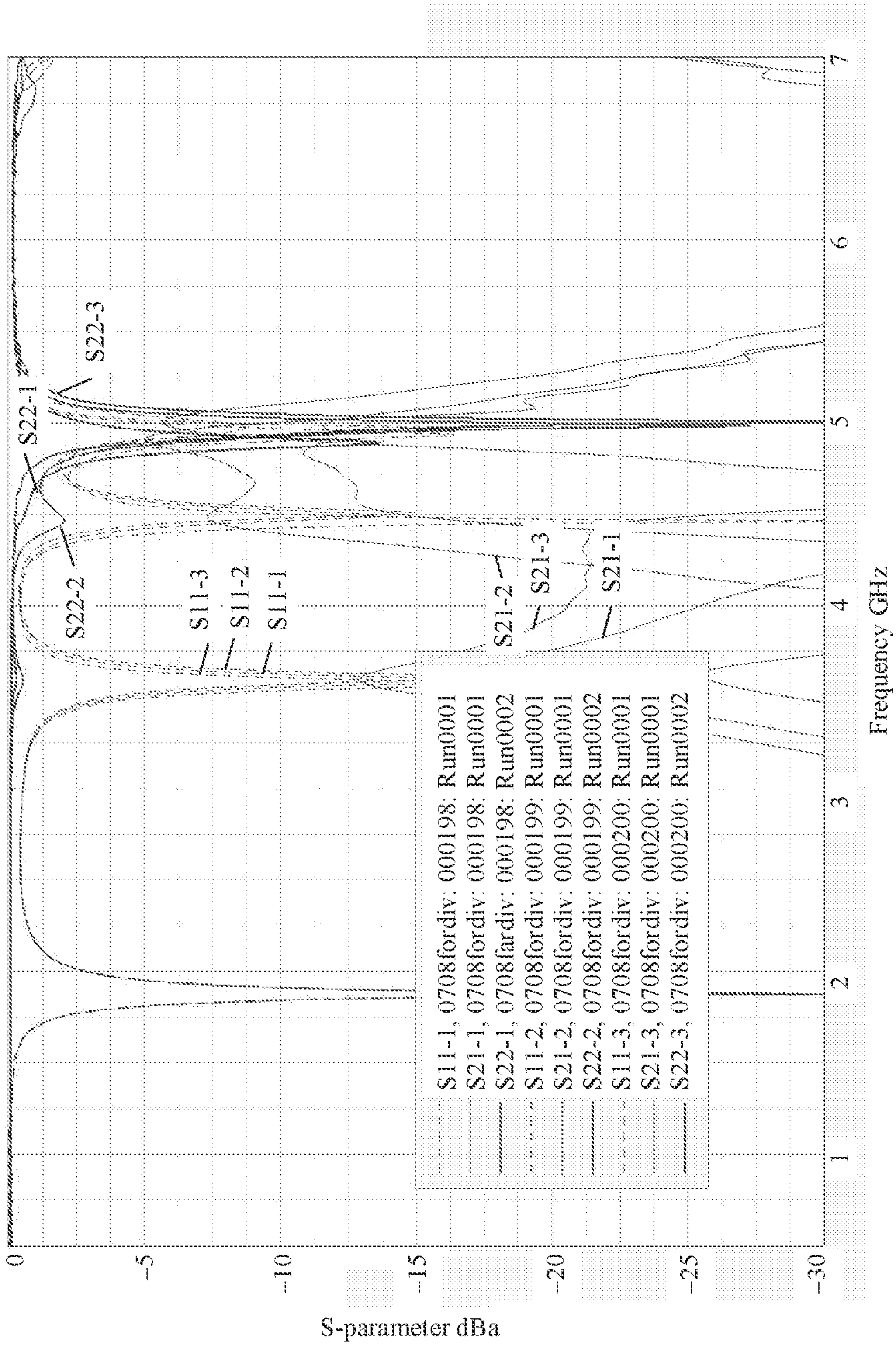
FIG. 12*c* is a curve diagram showing that an S-parameter of an antenna apparatus changes with a frequency according to an embodiment of this application.

FIG. 12*c* is a curve diagram showing that an S-parameter of an antenna apparatus changes with a frequency according to an embodiment of this application. The curve diagram shown in FIG. 12*c* is obtained by performing a simulation test on the antenna apparatus shown in FIG. 8 (where frequencies of both the first radio wave and the second radio wave fall within the N79 frequency band). Curves S11-1, S21-1, and S22-1 respectively represent an input reflection coefficient of the second frame branch 22, an input reflection coefficient of the second branch 40, and a transmission coefficient from the second branch 40 to the second frame branch 22 when L1=0. Curves S11-2, S21-2, and S22-2 respectively represent an input reflection coefficient of the second frame branch 22, an input reflection coefficient of the second branch 40, and a transmission coefficient from the second branch 40 to the second frame branch 22 when L1=−1 mm (to be specific, the second branch shown in FIG. 8 is offset rightwards by 1 mm). Curves S11-3, S21-3, and S22-3 respectively represent an input reflection coefficient of the second frame branch 22, an input reflection coefficient of the second branch 40, and a transmission coefficient from the second branch 40 to the second frame branch 22 when L1=1 mm (to be specific, the second branch shown in FIG. 8 is offset leftwards by 1 mm). It can be learned that, a location of the decoupling pit that implements decoupling between the second frame branch and the second branch may be adjusted by changing L1. When other conditions of the apparatus remain unchanged, if the first distance is less than or equal to one tenth of the wavelength of the second radio wave radiated by the second branch, a frequency corresponding to the decoupling pit is reduced when the second branch moves leftwards relative to the first center line, and a frequency corresponding to the decoupling pit is increased when the second branch moves rightwards relative to the first center line.

Figure 12D:
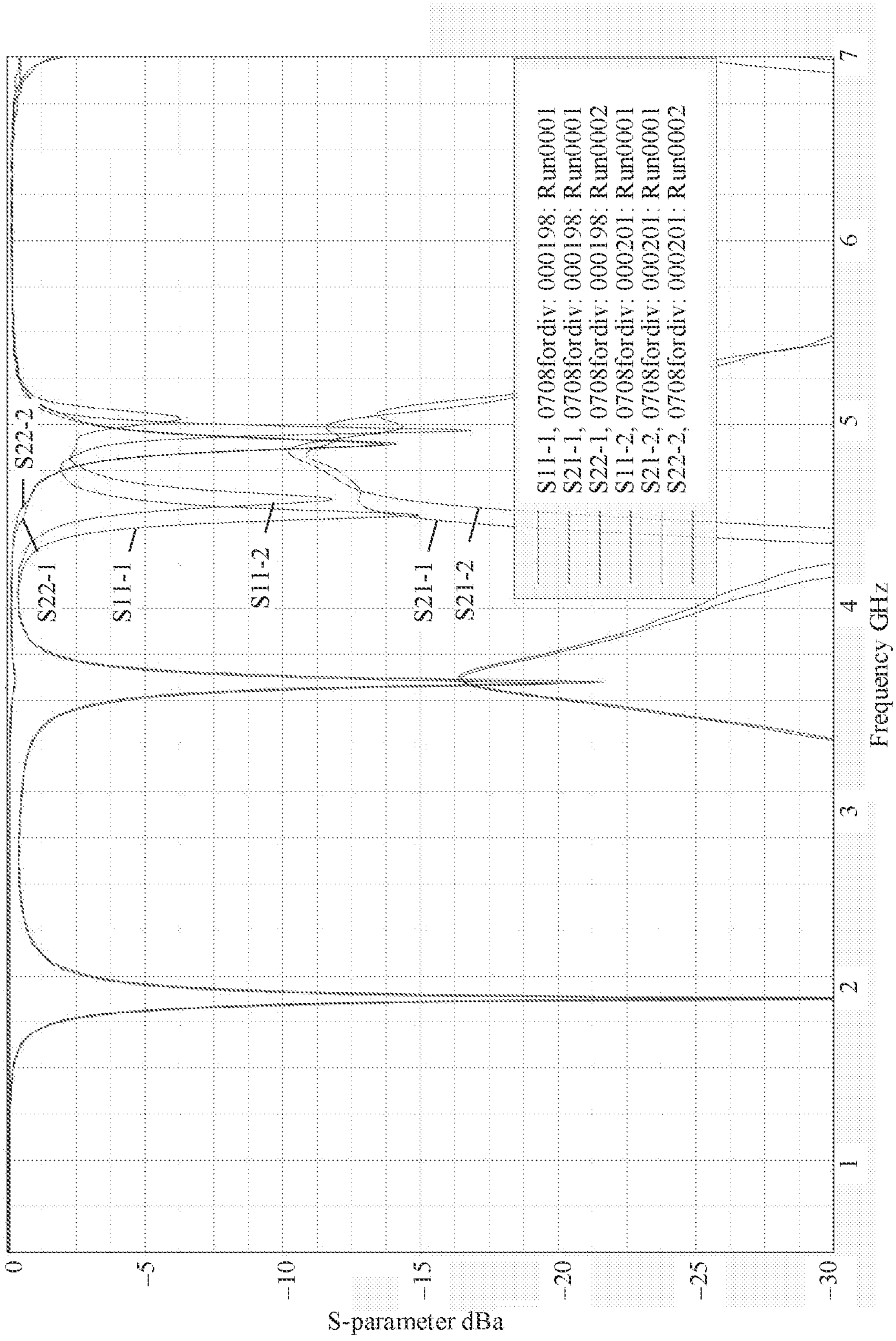
FIG. 12*d* is a curve diagram showing that an S-parameter of an antenna apparatus changes with a frequency according to an embodiment of this application.

FIG. 12*d* is a curve diagram showing that an S-parameter of an antenna apparatus changes with a frequency according to an embodiment of this application. The curve diagram shown in FIG. 12*d* is obtained by performing a simulation test on the antenna apparatus shown in FIG. 8 (where frequencies of both the first radio wave and the second radio wave fall within the N79 frequency band). Curves S11-1, S22-1, and S21-1 respectively represent an input reflection coefficient of the second frame branch 22, an input reflection coefficient of the second branch 40, and a transmission coefficient from the second branch 40 to the second frame branch 22 when a length of the first branch is 12.7 mm. Curves S11-2, S22-2, and S21-2 respectively represent an input reflection coefficient of the second frame branch 22, an input reflection coefficient of the second branch 40, and a transmission coefficient from the second branch 40 to the second frame branch 22 when a length of the first branch is 11.8 mm. It can be learned that, a location of the decoupling pit that implements decoupling between the second frame branch and the second branch may be adjusted by changing a length of the first branch 30. When other conditions of the apparatus remain unchanged, if a length of the first branch is less than a half of the wavelength of the second radio wave radiated by the second branch and is greater than a quarter of the wavelength of the second radio wave radiated by the second branch, a larger length of the first branch indicates a lower frequency corresponding to the decoupling pit.

Figure 13A:
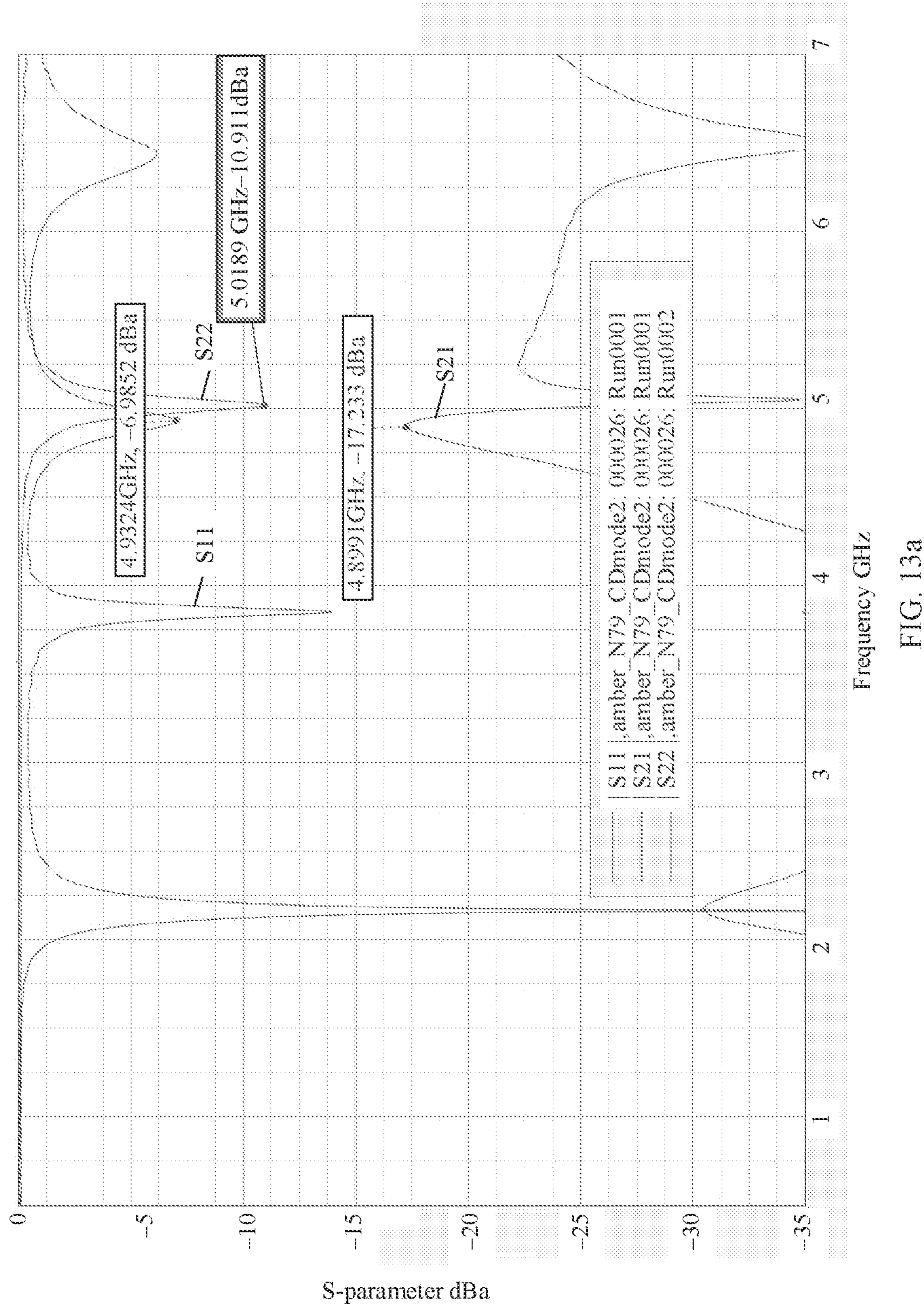
FIG. 13*a* is a curve diagram showing that an S-parameter of an antenna apparatus changes with a frequency according to an embodiment of this application.
Figure 13B:
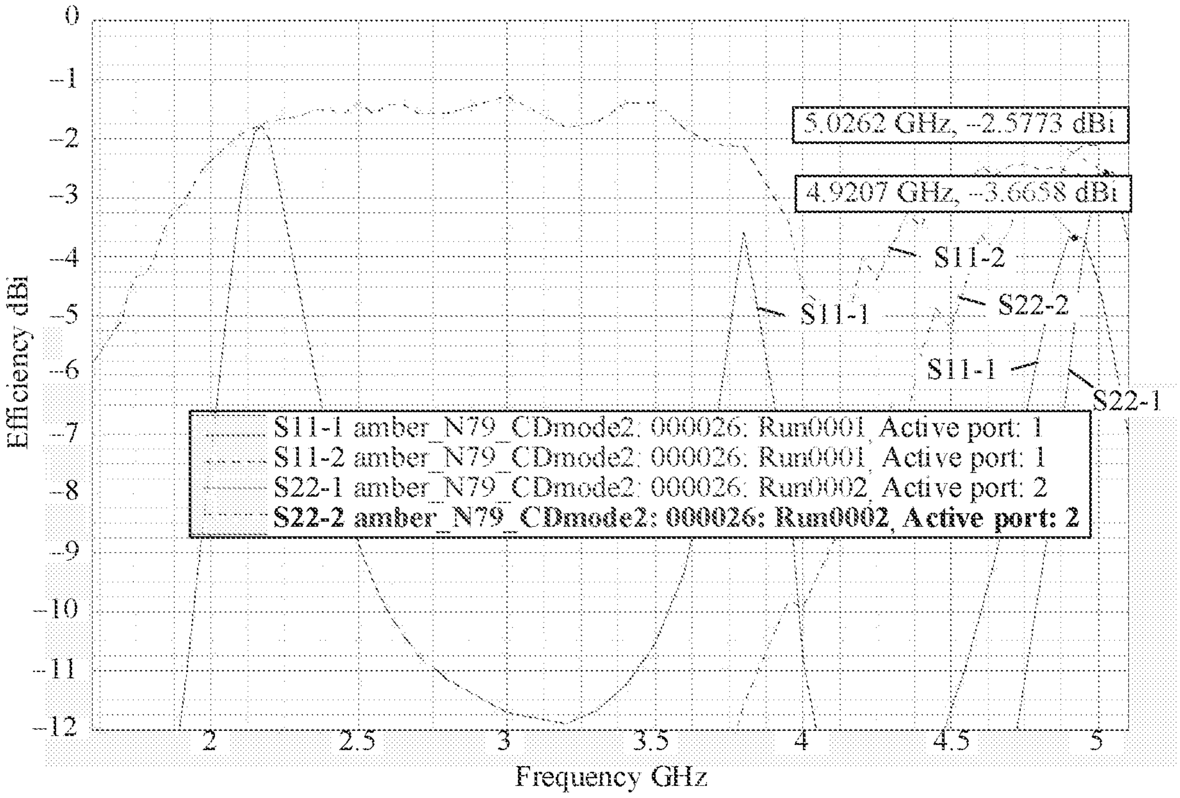
FIG. 13*b* is a curve diagram showing that efficiency of an antenna apparatus changes with a frequency according to an embodiment of this application.

FIG. 13*a* is a curve diagram showing that an S-parameter of an antenna apparatus changes with a frequency according to an embodiment of this application. The curve diagram shown in FIG. 13*a* is obtained by performing a simulation test on the antenna apparatus shown in FIG. 9 (where frequencies of both the first radio wave and the second radio wave are 4.9 GHZ). As shown in FIG. 13*a*, a curve S11 represents an input reflection coefficient of the second frame branch 22, and a curve S22 is an input reflection coefficient of the second branch 40. A curve S21 represents a transmission coefficient from the second branch 40 to the second frame branch 22, and is a ratio of a transmit power to an incident power, and a specific negative value of the curve represents isolation between the second frame branch and the second branch. FIG. 13*b* is a curve diagram showing that efficiency of an antenna apparatus changes with a frequency according to an embodiment of this application. The curve diagram shown in FIG. 13*b* is obtained by performing a simulation test on the antenna apparatus shown in FIG. 9 (where frequencies of both the first radio wave and the second radio wave are 4.9 GHZ). As shown in FIG. 13*b*, a curve S11-1 represents system efficiency of the second frame branch 22, and a curve S11-2 represents radiation efficiency of the second frame branch 22. A curve S22-1 represents system efficiency of the second branch 40, and a curve S22-2 represents radiation efficiency of the second branch 40. Through analysis with reference to FIG. 13*a* and FIG. 13*b*, it may be determined that, shortening the length of the first frame branch of the antenna apparatus can also obtain a decoupling pit that implements decoupling between the second frame branch and the second branch.

Figure 13C:
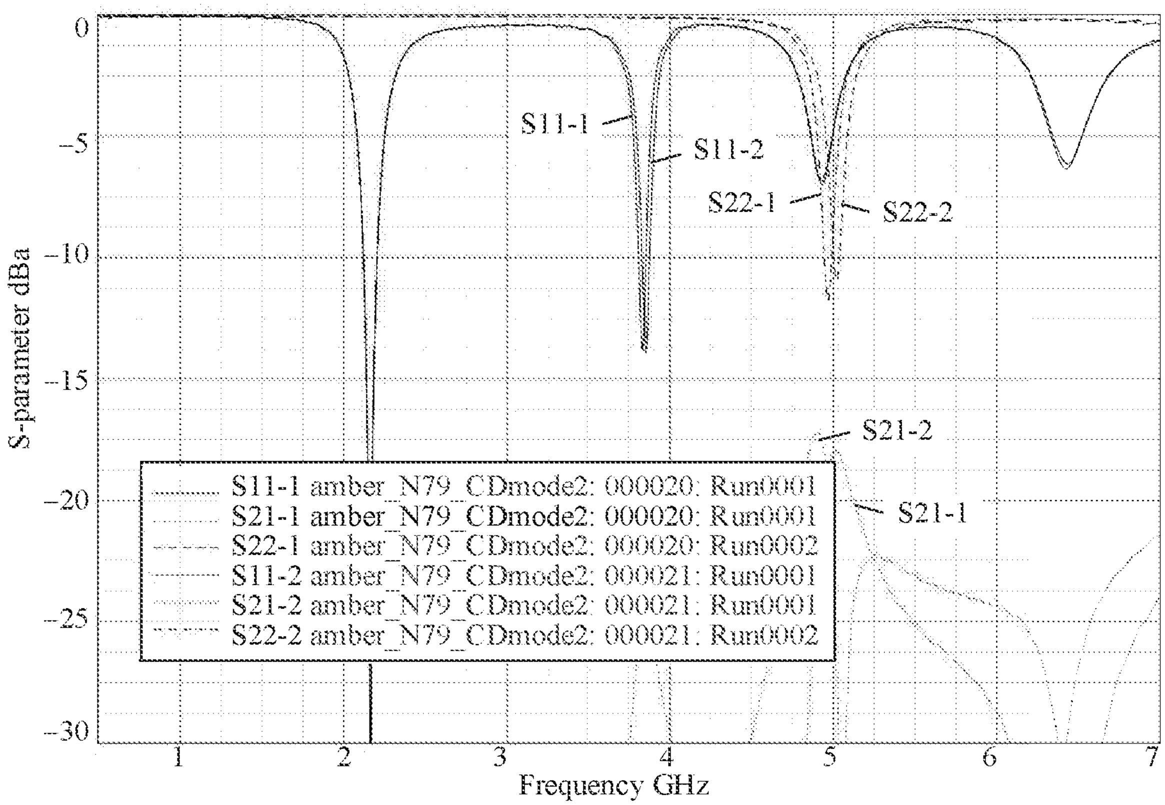
FIG. 13*c* is a curve diagram showing that an S-parameter of an antenna apparatus changes with a frequency according to an embodiment of this application.

FIG. 13*c* is a curve diagram showing that an S-parameter of an antenna apparatus changes with a frequency according to an embodiment of this application. The curve diagram shown in FIG. 13*c* is obtained by performing a simulation test on the antenna apparatus shown in FIG. 9 (where frequencies of both the first radio wave and the second radio wave fall within the N79 frequency band). Curves S11-1, S21-1, and S22-1 respectively represent an input reflection coefficient of the second frame branch 22, an input reflection coefficient of the second branch 40, and a transmission coefficient from the second branch 40 to the second frame branch 22 when L1=−1 mm (to be specific, the second branch shown in FIG. 9 is offset rightwards by 1 mm). Curves S11-3, S21-3, and S22-3 respectively represent an input reflection coefficient of the second frame branch 22, an input reflection coefficient of the second branch 40, and a transmission coefficient from the second branch 40 to the second frame branch 22 when L1=0.1 mm (to be specific, the second branch shown in FIG. 9 is offset leftwards by 0.4 mm). It can be learned that, a location of the decoupling pit that implements decoupling between the second frame branch and the second branch may be adjusted by changing L1. When other conditions of the apparatus remain unchanged, if the first distance is less than or equal to one tenth of the wavelength of the second radio wave radiated by the second branch, a frequency corresponding to the decoupling pit is reduced when the second branch moves leftwards relative to the first center line, and a frequency corresponding to the decoupling pit is increased when the second branch moves rightwards relative to the first center line.

In a possible implementation, the first distance between the symmetry axis of the second branch and the first center line and the length of the first branch may be simultaneously adjusted, to ensure that frequencies corresponding to locations of the decoupling pit are the frequencies of the first radio wave and the second radio wave, and implement decoupling between the second branch and the second frame branch.

The flowcharts and the block diagrams in the accompanying drawings illustrate system architectures, functions, and operations of possible implementations of apparatuses, systems, methods, and computer program products according to a plurality of embodiments of this application. In this regard, each block in the flowcharts or the block diagrams may represent a module, a program segment, or a part of instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by hardware (for example, a circuit or an ASIC (Application-Specific Integrated Circuit, application-specific integrated circuit)) that performs a corresponding function or action, or may be implemented by a combination of hardware and software, for example, firmware.

Although the present invention is described with reference to embodiments, in a process of implementing the present invention that claims protection, a person skilled in the art may understand and implement another variation of the disclosed embodiments by viewing the accompanying drawings, the disclosed content, and the accompanying claims. In the claims, “comprising” (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Embodiments of this application are described above. The foregoing descriptions are examples, are not exhaustive, and are not limited to the disclosed embodiments. Many modifications and changes are apparent to a person of ordinary skill in the art without departing from the scope and spirit of the described embodiments. The selection of terms used in this specification is intended to best explain the principles of the embodiments, practical application, or improvements to technologies in the market, or to enable another person of ordinary skill in the art to understand the embodiments disclosed in this specification.

What is claimed is:

1. An antenna apparatus comprising:

a reference ground;

a frame branch comprising a first gap, wherein the first gap defines a first center line, wherein the first center line is perpendicular to a length direction of the frame branch, wherein the frame branch is divided into a first frame branch and a second frame branch by the first gap, wherein the first frame branch comprises a first frame branch first end distal from the first gap and electrically coupled to the reference ground, and wherein the second frame branch comprises a second frame branch first end distal from the first gap and electrically coupled to the reference ground;

a second branch, wherein the second branch defines a second center line perpendicular to a length direction of the second branch;

a first branch between the frame branch and the second branch, wherein the first branch defines a third center line perpendicular to a length direction of the first branch, wherein the first branch intersects with the first center line in a direction perpendicular to the length direction, wherein the frame branch, the first branch and the second branch are conductive, are not in contact with each other and are insulated from each other, wherein the first branch is mirror-symmetric with respect to the third center line and the second branch is mirror-symmetric with respect to the second center line, and wherein the second center line of the second branch is spaced from the first center line by a first distance;

a first feeding circuit electrically coupled to the second frame branch and configured to transmit a first excitation signal to the second frame branch to excite the second frame branch to radiate a first radio wave; and a second feeding circuit electrically coupled to the second branch and configured to transmit a second excitation signal to the second branch to excite the second branch to radiate a second radio wave.

2. The antenna apparatus of claim 1, wherein the first distance is less than or equal to one tenth of a wavelength of the second radio wave.

3. The antenna apparatus of claim 1, wherein each of the first frame branch, the second frame branch, the first branch, and the second branch is strip-shaped.

4. The antenna apparatus of claim 1, wherein the first branch defines a reinforcing rib of the first gap, wherein a length of the first branch is less than a half of a wavelength of the second radio wave and greater than a quarter of the wavelength of the second radio wave, and wherein a second distance between the first branch and the frame branch is less than one fifth of the wavelength of the second radio wave.

5. The antenna apparatus of claim 1, wherein the first feeding circuit is further configured to transmit the first excitation signal to the second frame branch to generate, on the second frame branch, a first current that flows away from a center of the second frame branch, and wherein the second feeding circuit is further configured to transmit the second excitation signal to the second branch to generate, on the second branch, a second current that flows to a center of the second branch.

6. The antenna apparatus of claim 1, wherein the second feeding circuit is further configured to transmit the second excitation signal to the second branch through a feedpoint located on the second branch.

7. The antenna apparatus of claim 1, wherein the second frame branch comprises a plurality of frame feedpoints, and wherein the first feeding circuit is electrically coupled to the frame feedpoints and further configured to transmit corresponding first excitation signals to the second frame branch through different frame feedpoints to enable the second frame branch to radiate the first radio wave with a plurality of radiation frequencies.

8. The antenna apparatus of claim 7, wherein the plurality of radiation frequencies of the first radio wave is within a range of 1700 megahertz (MHz) to 2700 MHz, 3300 MHz to 4200 MHz, or 4400 MHz to 5000 MHz, and wherein a radiation frequency range of the second radio wave is 4400 MHz to 5000 MHz.

9. The antenna apparatus of claim 1, wherein the first frame branch further comprises a first frame branch second end located proximate to the first gap, and wherein the antenna apparatus further comprises a third feeding circuit electrically coupled to the first frame branch second end and configured to transmit a third excitation signal to the first frame branch when a first length of the first frame branch is greater than a second length of the second frame branch.

10. The antenna apparatus of claim 9, wherein the third feeding circuit is further configured to excite the first frame branch to radiate a third radio wave, and wherein a radiation frequency range of the third radio wave is different from radiation frequency ranges of both the first radio wave and the second radio wave.

11. The antenna apparatus of claim 1, wherein the first frame branch further comprises a first frame branch second end proximate to the first gap, and wherein when a length of the first frame branch is less than or equal to a length of the second frame branch, both the first frame branch first end and the first frame branch second end are configured to be grounded or the first frame branch first end is configured to be electrically coupled to the reference ground and the first frame branch second end is open.

12. The antenna apparatus of claim 10, wherein the second frame branch further comprises a second frame branch second end, wherein the second branch further comprises a center feedpoint.

13. An electronic device comprising:

a metal frame; and an antenna apparatus coupled to the metal frame and comprising:

a reference ground;

a frame branch comprising a first gap, wherein the first gap defines a first center line, wherein the first center line is perpendicular to a length direction of the frame branch, wherein the frame branch is divided into a first frame branch and a second frame branch by the first gap, wherein the first frame branch and the second frame branch are part of the metal frame, wherein the first frame branch comprises a first frame branch first end distal from the first gap and electrically coupled to the reference ground, and wherein the second frame branch comprises a second frame branch first end distal from the first gap and electrically coupled to the reference ground;

a second branch, wherein the second branch defines a second center line perpendicular to a length direction of the second branch;

a first branch between the frame branch and the second branch, wherein the first branch defines a third center line perpendicular to a length direction of the first branch, wherein the first branch intersects with the first center line in a direction perpendicular to the length direction, wherein the frame branch, the first branch and the second branch are conductive, are not in contact with each other and are insulated from each other, wherein the first branch is mirror-symmetric with respect to the third center line and the second branch is mirror-symmetric with respect to the second center line, the second center line of the second branch is spaced from the first center line by a first distance;

a first feeding circuit electrically coupled to the second frame branch and configured to transmit a first excitation signal to the second frame branch to excite the second frame branch to radiate a first radio wave; and a second feeding circuit electrically coupled to the second branch and configured to transmit a second excitation signal to the second branch to excite the second branch to radiate a second radio wave.

14. The electronic device of claim 13, wherein the first distance is less than or equal to one tenth of a wavelength of the second radio wave.

15. The electronic device of claim 13, wherein each of the first frame branch, the second frame branch, the first branch, and the second branch is strip-shaped.

16. The electronic device of claim 13, wherein the first branch defines a reinforcing rib of the first gap, wherein a length of the first branch is less than a half of a wavelength of the second radio wave and is greater than a quarter of the wavelength of the second radio wave, and wherein a second distance between the first branch and the frame branch is less than one fifth of the wavelength of the second radio wave.

17. The electronic device of claim 13, wherein the first frame branch further comprises a first frame branch second end proximate to the first gap, and wherein the antenna apparatus further comprises a third feeding circuit electrically coupled to the first frame branch second end and configured to transmit a third excitation signal to the first frame branch when a length of the first frame branch is greater than a length of the second frame branch.

18. The electronic device of claim 17, wherein the third feeding circuit is further configured to excite the first frame branch to radiate a third radio wave, and wherein a radiation frequency range of the third radio wave is different from radiation frequency ranges of both the first radio wave and the second radio wave.

19. The electronic device of claim 13, wherein the first frame branch further comprises a first frame branch second end proximate to the first gap, and wherein when a length of the first frame branch is less than or equal to a length of the second frame branch, both the first frame branch first end and the first frame branch second end are configured to be grounded or the first frame branch first end is configured to be electrically coupled to the reference ground and the first frame branch second end is open.

20. The electronic device of claim 13, wherein the first distance is less than or equal to one tenth of a wavelength of the second radio wave.

* * * * *